(12) United States Patent
Terasawa

(10) Patent No.: US 8,155,440 B2
(45) Date of Patent: Apr. 10, 2012

(54) IMAGE PROCESSING APPARATUS AND IMAGE PROCESSING METHOD

(75) Inventor: Ken Terasawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 12/639,738

(22) Filed: Dec. 16, 2009

(65) Prior Publication Data

US 2010/0165208 A1   Jul. 1, 2010

(30) Foreign Application Priority Data

Dec. 26, 2008   (JP) .................................. 2008-335230
Nov. 24, 2009   (JP) .................................. 2009-266768

(51) Int. Cl.
*G06K 9/00* (2006.01)
(52) U.S. Cl. ......... 382/167; 382/162; 382/274; 348/468
(58) Field of Classification Search .................. 382/162, 382/167, 274.232; 358/518, 519, 520, 523; 348/453, 468; 345/589, 590, 581, 596
See application file for complete search history.

(56) References Cited

U.S. PATENT DOCUMENTS

| | | | |
|---|---|---|---|
| 6,914,628 B1 | 7/2005 | Kuwata et al. | |
| 7,375,521 B1 * | 5/2008 | Damadian et al. | ............ 324/307 |
| 2003/0038933 A1 * | 2/2003 | Shirley et al. | ............... 356/243.1 |
| 2011/0268357 A1 * | 11/2011 | Sawada et al. | ................ 382/167 |

FOREIGN PATENT DOCUMENTS

| | | |
|---|---|---|
| JP | 2003-102027 | 4/2003 |
| JP | 2003-102028 | 4/2003 |
| JP | 2007-195122 | 8/2007 |

* cited by examiner

*Primary Examiner* — Samir Ahmed
*Assistant Examiner* — Ali Bayat
(74) *Attorney, Agent, or Firm* — Cowan, Liebowitz & Latman, P.C.

(57) ABSTRACT

The gradients of a reference image signal and suppression target image signals are respectively detected. Suppression coefficients are computed according to functions defined based on the magnitude relationship among the gradient value of the reference image signal and those of the suppression target image signals. The reference image signal is weighted according to the suppression coefficients, the weighted signals are combined with the corresponding suppression target image signals, and the combined signals are output as color component signals after color fringing suppression. Then, color fringing can be effectively corrected while suppressing correction errors.

8 Claims, 20 Drawing Sheets

| -1 | 0 | 1 |
|---|---|---|
| -2 | 0 | 2 |
| -1 | 0 | 1 |

| -1 | -2 | -1 |
|---|---|---|
| 0 | 0 | 0 |
| 1 | 2 | 1 |

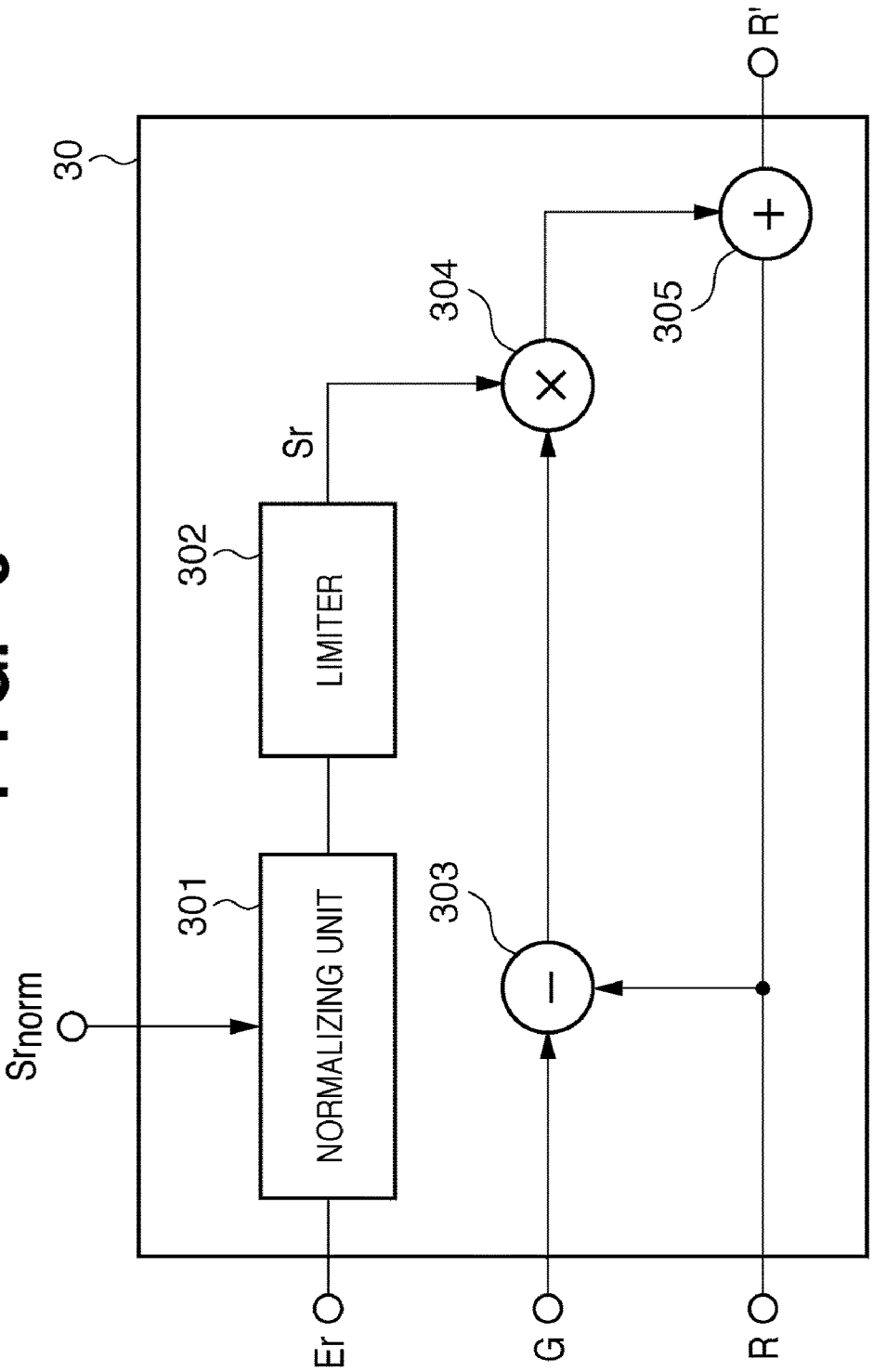

VALUE=1.0

VALUE=0.75

VALUE=0.50

VALUE=0.25

VALUE=0.00

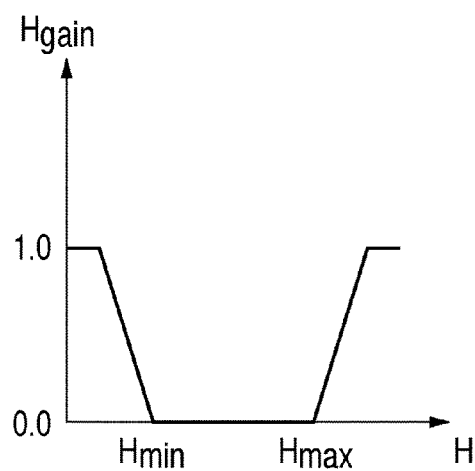
F I G. 15A
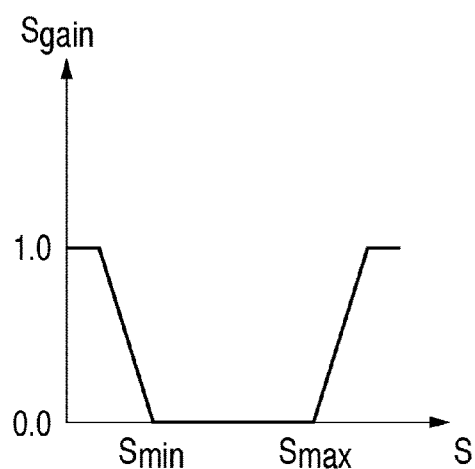
F I G. 15B
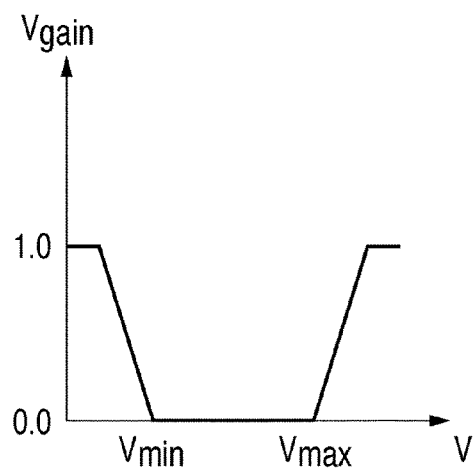
F I G. 15C

IMAGE PROCESSING APPARATUS AND IMAGE PROCESSING METHOD

BACKGROUND OF THE INVENTION

1. Field of the Invention

The present invention relates to an image processing apparatus and image processing method and, more particularly, to an image processing apparatus and image processing method, which correct chromatic aberrations due to optical factors and suppress any color fringing.

2. Description of the Related Art

Recent digital video cameras and digital cameras can obtain high-quality images by adopting image sensors with a large number of pixels.

On the negative side, the influences of chromatic aberrations resulting from different focal lengths for respective light wavelengths and, more specifically, color fringing readily appear in images due to factors of miniaturized pixels, compact lenses, and so forth.

Conventionally, as a technique for suppressing any color fringing in a sensed image, various methods have been proposed. Japanese Patent Laid-Open No. 2007-195122 proposes a technique for suppressing any color fringing by detecting an edge in an image acquired by an imaging device, and reducing a tone of a color signal near the detected edge position according to tone reduction rules obtained based on optical parameters.

For example, when a high-power zoom lens, which is often used in video cameras, is used, the color fringing characteristics vary intricately depending on the image height from the optical axis center to a pixel of interest, zoom ratio, aperture value, and focus lens position. For this reason, the simple tone reduction rules described in Japanese Patent Laid-Open No. 2007-195122 cannot effectively suppress any color fringing. Therefore, in practice it is difficult to control the color fringing suppression level using only the position of the pixel of interest within a frame as a criterion.

The method described in Japanese Patent Laid-Open No. 2007-195122 cannot attain color fringing suppression for RGB signals. For this reason, this method must be mere achromatic processing that adjusts the gains of color difference signals, and is not suitable for color fringing suppression processing.

Japanese Patent Laid-Open No. 2003-102027 and Japanese Patent Laid-Open No. 2003-102028 disclose the following technique. That is, color fringing is determined by seeing if a degree of change in color difference data and a difference between colors exceed corresponding thresholds. Also, edges are detected from image data, and color fringing is suppressed using a low-pass filter (LPF) and median filter depending on positions near the edges.

However, since color fringing region determination is binary determination processing as to whether or not to apply color fringing suppression, when low thresholds are set for the degree of change in color difference data and the difference between colors, a color edge part of an image signal having a strong gradient is erroneously determined as a color fringing part. As a result, the color edge part where no color fringing occurs is erroneously corrected, in other words, correction of color fringing occurs where it is not required as well as where it is required.

By contrast, when high thresholds are set for the degree of change in color difference data or the difference between colors so as to avoid such determination errors, color fringing that occurs in a low-gradient part cannot be determined, and color fringing correction becomes insufficient, in other words, correction of color fringing is not always performed when required. Also, since color fringing corrected part and non-corrected part are clearly differentiated, corrected and non-corrected parts in one image may be visualized as steps, or those between frames of a movie may be perceived as steps.

SUMMARY OF THE INVENTION

The present invention has been made in consideration of the conventional problems, and provides an image processing apparatus and image processing method, which can solve at least one of the conventional problems, and can effectively correct color fringing while suppressing or reducing correction errors.

According to an aspect of the present invention, there is provided an image processing apparatus for suppressing color fringing of an image defined by a plurality of pixels, comprising: a reference gradient detecting unit adapted to detect a gradient from an image signal of a luminance component or one of color components of a pixel, which is used as a reference image signal, and output a reference gradient signal; a suppression target gradient detecting unit adapted to detect gradients of image signals of color components different from the reference image signal of the pixel, which are used as suppression target image signals, and output suppression target gradient signals; a suppression coefficient computing unit adapted to compute color fringing suppression coefficients of the respective suppression target image signals of the pixel, based on the reference gradient signal and the suppression target gradient signals; and a combining unit adapted to combine each of the suppression target image signals of the pixel with the reference image signal by weighting the reference image signal based on the color fringing suppression coefficients, and output the combined signals as image signals of the color components in which the color fringing is suppressed, wherein said suppression coefficient computing unit defines a plurality of regions in accordance with magnitude relationships between values of the reference gradient signal and the suppression target gradient signals, allocates a function in advance to each of the regions and computes the color fringing suppression coefficients of the respective suppression target image signals of the pixel by classifying the respective suppression target image signals into one of the plurality of regions and using the respective function allocated to that region to compute the color fringing suppression coefficient.

Further features of the present invention will become apparent from the following description of exemplary embodiments with reference to the attached drawings.

BRIEF DESCRIPTION OF THE DRAWINGS

FIG. 8 is a block diagram showing an example of the arrangement of first and second signal combining units 30 and 31 in the image processing apparatus according to the first embodiment of the present invention;

FIGS. 15A to 15C are views showing examples of gains output from comparators 401 to 403 in the image processing apparatus according to the third embodiment of the present invention;

DESCRIPTION OF THE EMBODIMENTS

Exemplary embodiments of the present invention will now be described in detail in accordance with the accompanying drawings.

(First Embodiment)

Figure 1:
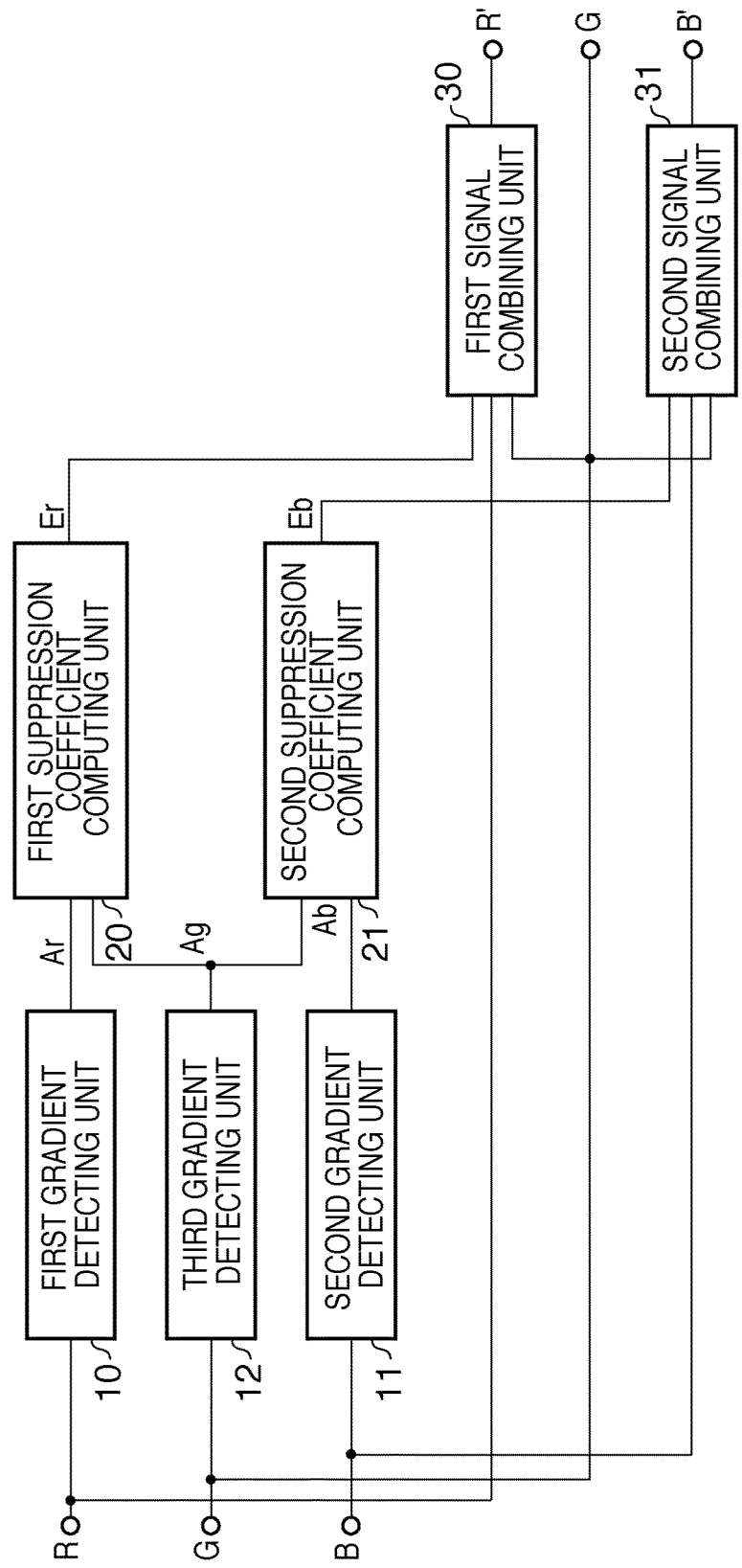
FIG. 1 is a block diagram showing an example of the arrangement of an image processing apparatus according to the first embodiment of the present invention.

FIG. 1 is a block diagram showing an example of the arrangement of an image processing apparatus, e.g. a PC, a digital still camera, and a digital video camera, according to the first embodiment of the present invention.

An image signal (which may be a video signal in any of the embodiments described herein) obtained by a digital video camera, digital camera, or the like (not shown) is separated into R (a red color component image signal; to be abbreviated as R hereinafter), G (a green color component image signal; to be abbreviated as G hereinafter), and B (a blue color component image signal; to be abbreviated as B hereinafter) as three primary colors. Then, these color component image signals are input to the image processing apparatus shown in FIG. 1.

In color fringing correction processing, an image signal such as a luminance signal having a wide band color component is used as a reference image signal, and image signals of other color components are used as suppression target image signals (e.g. image signals targeted for suppression or reduction of color-fringing).

In the first embodiment, G is used as a reference image signal having a color component approximate to luminance, and R and B are used as suppression target image signals.

R, B, and G image signals are respectively input to first to third gradient detecting units 10, 11, and 12, which respectively output corresponding gradient signals Ar, Ab, and Ag. The gradient signals Ar and Ab of the suppression target image signals R and B are suppression target gradient signals, and the gradient signal Ag of the reference image signal G is a reference gradient signal.

Of these signals, the gradient signals Ar and Ag are input to a first suppression coefficient computing unit 20. The first suppression coefficient computing unit 20 compares the gradient signals Ar and Ag, and outputs a color fringing suppression coefficient Er of the suppression target image signal R.

The gradient signals Ab and Ag are input to a second suppression coefficient computing unit 21. The second suppression coefficient computing unit 21 compares the gradient signals Ab and Ag, and outputs a color fringing suppression coefficient Eb of the suppression target image signal B.

A first signal combining unit 30 receives the color fringing suppression coefficient Er, reference image signal G, and suppression target image signal R. The first signal combining unit 30 weighted-combines the reference image signal G and suppression target image signal R according to the color fringing suppression coefficient Er (e.g. combines the reference image signal G, weighted according to the color fringing suppression coefficient, and suppression target image signal R). The first signal combining unit then outputs a color fringing-suppressed suppression target image signal R' (where R' is image signal R corrected to reduce or suppress color-fringing).

A second signal combining unit 31 receives the color fringing suppression coefficient Eb, reference image signal G, and suppression target image signal B. The second signal combining unit 31 weighted-combines the reference image signal G and suppression target image signal B according to the color fringing suppression coefficient Eb (e.g. combines the reference image signal G, weighted according to the color fringing suppression coefficient, and suppression target image signal R). The second signal combining unit then and outputs a color fringing-suppressed suppression target image signal B' (where B' is image signal B corrected to reduce or suppress color-fringing).

The reference image signal G is output intact without receiving any color fringing suppression processing in the first and second signal combining units 30 and 31.

The respective components of FIG. 1 will be described in detail below.

Figure 2:
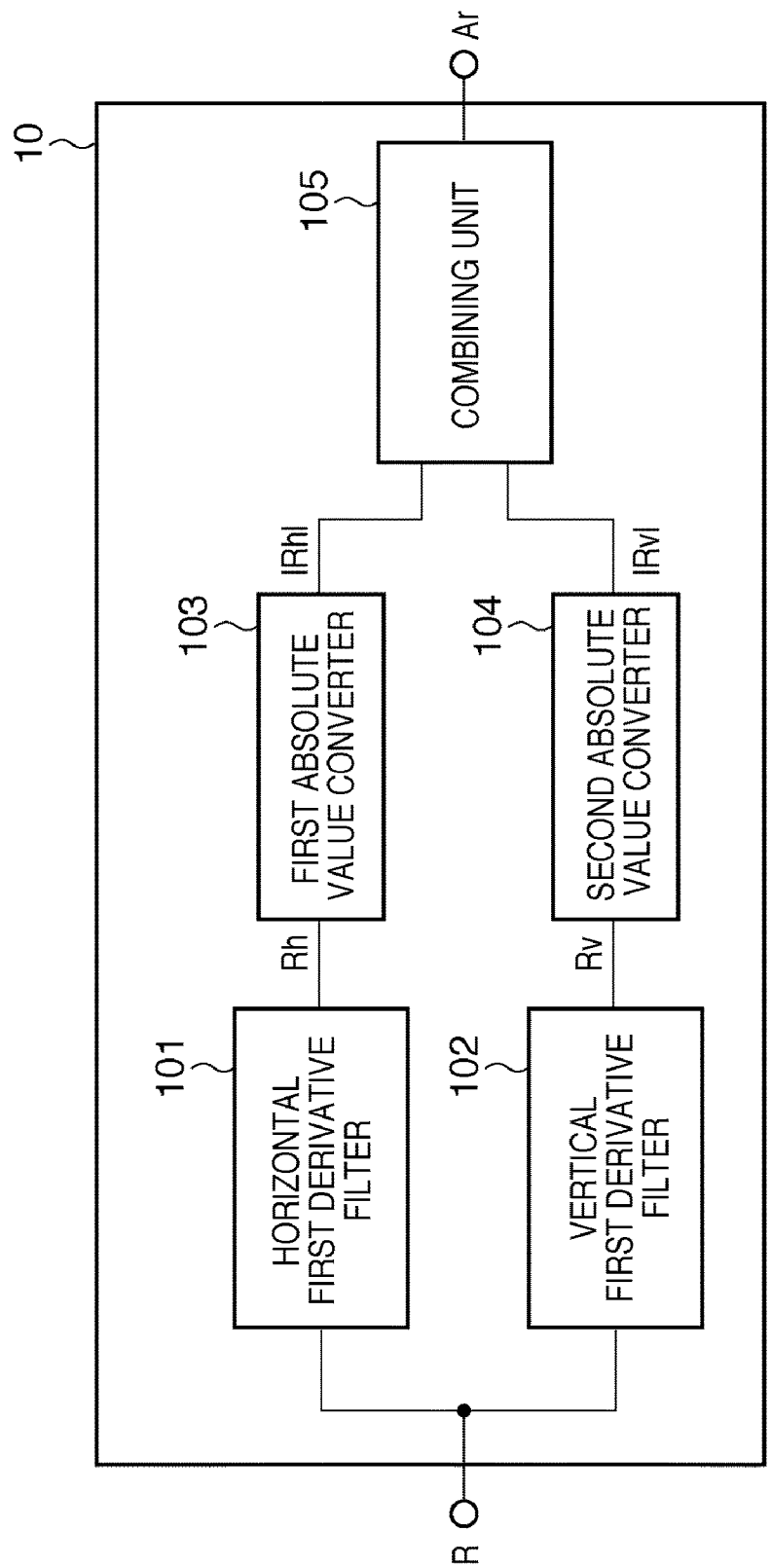
FIG. 2 is a block diagram showing an example of the arrangement of a first gradient detecting unit 10 in the image processing apparatus according to the first embodiment of the present invention.

FIG. 2 is a block diagram showing an example of the arrangement of the first gradient detecting unit 10. Note that since the first to third gradient detecting units 10 to 12 have a common arrangement, "R" or "r" in the following description may be respectively replaced by "G" or "g", or "B" or "b" in the second and third gradient detecting units 11 and 12.

An input signal R is input to a horizontal first derivative filter 101 and vertical first derivative filter 102 as spatial filters.

Figures 3A, 3B, 4:
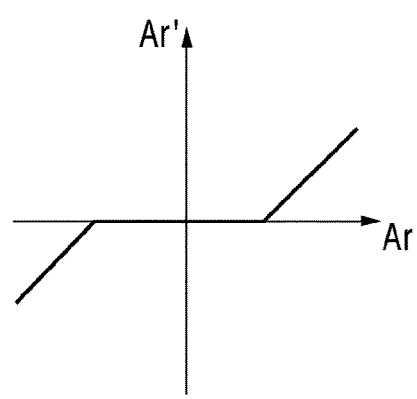
FIG. 3A is a view showing a practical example of a horizontal first derivative filter 101 included in the first gradient detecting unit shown in FIG. 2.
FIG. 3B is a view showing a practical example of a vertical first derivative filter 102 included in the first gradient detecting unit shown in FIG. 2.
FIG. 4 is a view for explaining coring processing in the first gradient detecting unit 10 shown in FIG. 2.

The horizontal first derivative filter 101 is a so-called Sobel filter of 3×3 pixels having filter coefficients shown in, e.g., FIG. 3A, and detects a first derivative value in the horizontal direction, i.e., a horizontal gradient value Rh of pixels included in a square region having a pixel of interest as the center.

The vertical first derivative filter 102 is a so-called Sobel filter of 3×3 pixels having filter coefficients shown in, for example, FIG. 3B, and detects a first derivative value in the vertical direction, that is, a vertical gradient value Rv of pixels included in a square region having a pixel of interest as the center.

The output horizontal gradient value Rh and vertical gradient value Rv are converted into absolute values |Rh| and |Rv| by a first absolute value converter 103 and second absolute value converter 104, and the converted values are input to a combining unit 105.

The combining unit 105 combines the horizontal gradient value |Rh| and vertical gradient value |Rv| by an arithmetic operation given by:

$$Ar=|Rh|+|Rv| \quad (1)$$

and outputs the gradient signal Ar.

Note that equation (1) and FIG. 2 are implemented by simple combination arithmetic operations that reduce the arithmetic load on hardware. However, when hardware resources are sufficient, it is desirable to compute a gradient value by computing the square root of the square sums of the horizontal gradient value Rh and vertical gradient value Rv like:

$$Ar=\sqrt{(Rh^2+Rv^2)} \quad (2)$$

In order to further eliminate the influence of noise, it is effective to use a signal Ar' obtained by applying coring processing to the gradient signal Ar, as shown in FIG. 4. The coring processing sets zero as a value within a small absolute value period.

The operations of the first and second suppression coefficient computing units 20 and 21 will be described below.

The operations and arrangements of the first and second suppression coefficient computing units 20 and 21 are common, except only for the signals to be processed. For this reason, the following description will be given in association with the first suppression coefficient computing unit 20. As for the second suppression coefficient computing unit 21, "R" or "r" in the following description can be replaced by "B" or "b".

The first suppression coefficient computing unit 20 receives the gradient value Ag of the reference image signal G and the gradient value Ar of the suppression target image signal R. A threshold g_th for the gradient value Ag and a threshold r_th for the gradient value Ar are set. These thresholds may be input from an external circuit (not shown).

The first suppression coefficient computing unit 20 decides a gradient attribute at the pixel of interest position, and computes a color fringing suppression coefficient.

Figure 5:
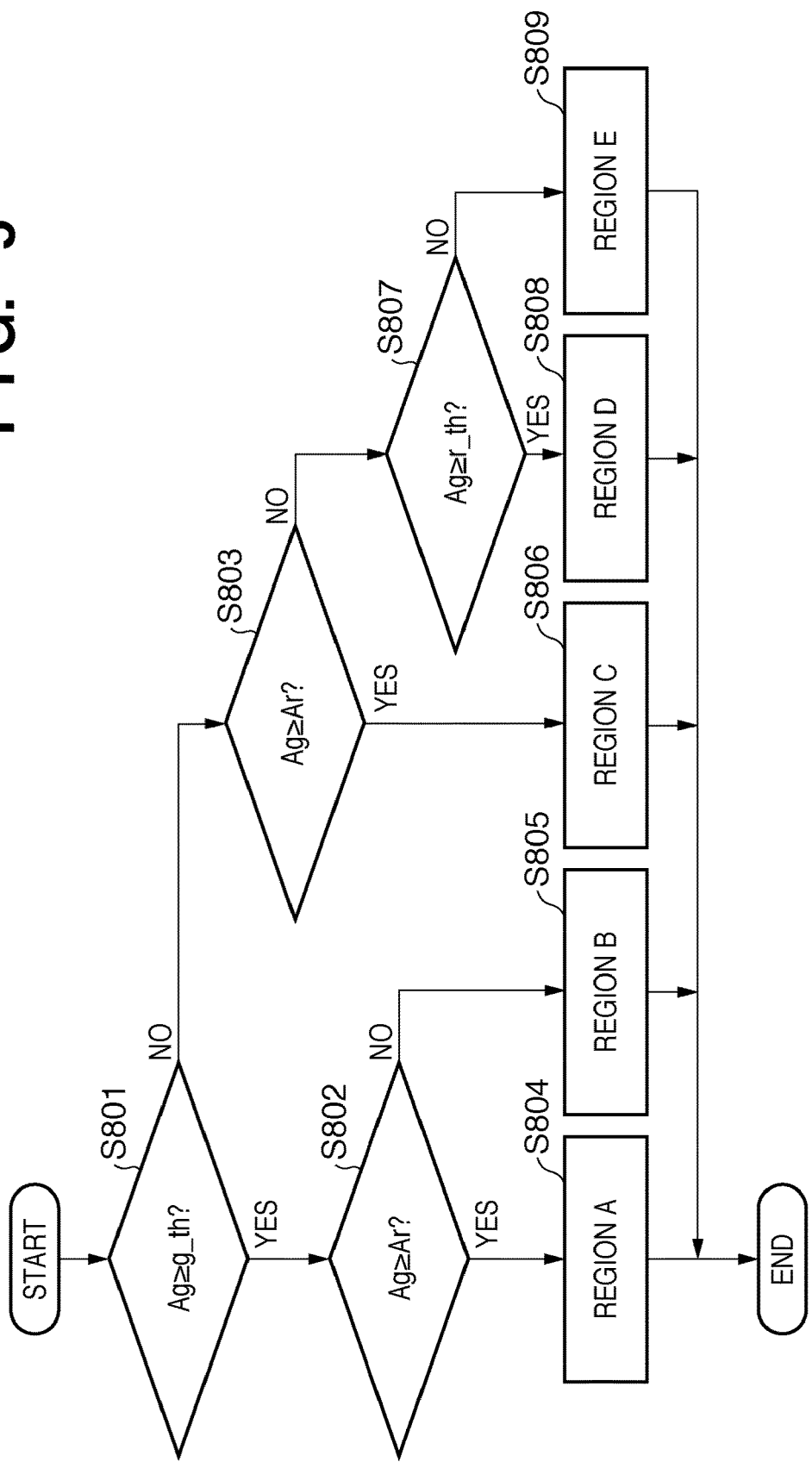
FIG. 5 is a flowchart for explaining a gradient attribute decision method in a first suppression coefficient computing unit 20 in the image processing apparatus according to the first embodiment of the present invention.

The gradient attribute decision method in the first suppression coefficient computing unit 20 will be described below with reference to the flowchart in FIG. 5.

In step S801, the first suppression coefficient computing unit 20 compares the gradient value Ag of the reference image signal G with the threshold g_th. If Ag≧g_th, the process advances to step S802; if Ag<g_th, the process advances to step S803.

In step S802, the first suppression coefficient computing unit 20 compares the gradient value Ag of the reference image signal G with the gradient value Ar of the suppression target image signal R. If Ag≧Ar, the process advances to step S804; if Ag<Ar, the process advances to step S805.

In step S803, the first suppression coefficient computing unit 20 compares the gradient value Ag of the reference image signal G with the gradient value Ar of the suppression target image signal R. If Ag≧Ar, the process advances to step S806; if Ag<Ar, the process advances to step S807.

In step S807, the first suppression coefficient computing unit 20 compares the gradient value Ar of the suppression target image signal R with the threshold r_th. If Ar≧r_th, the process advances to step 5808; if Ar<r_th, the process advances to step S809.

Figure 6:
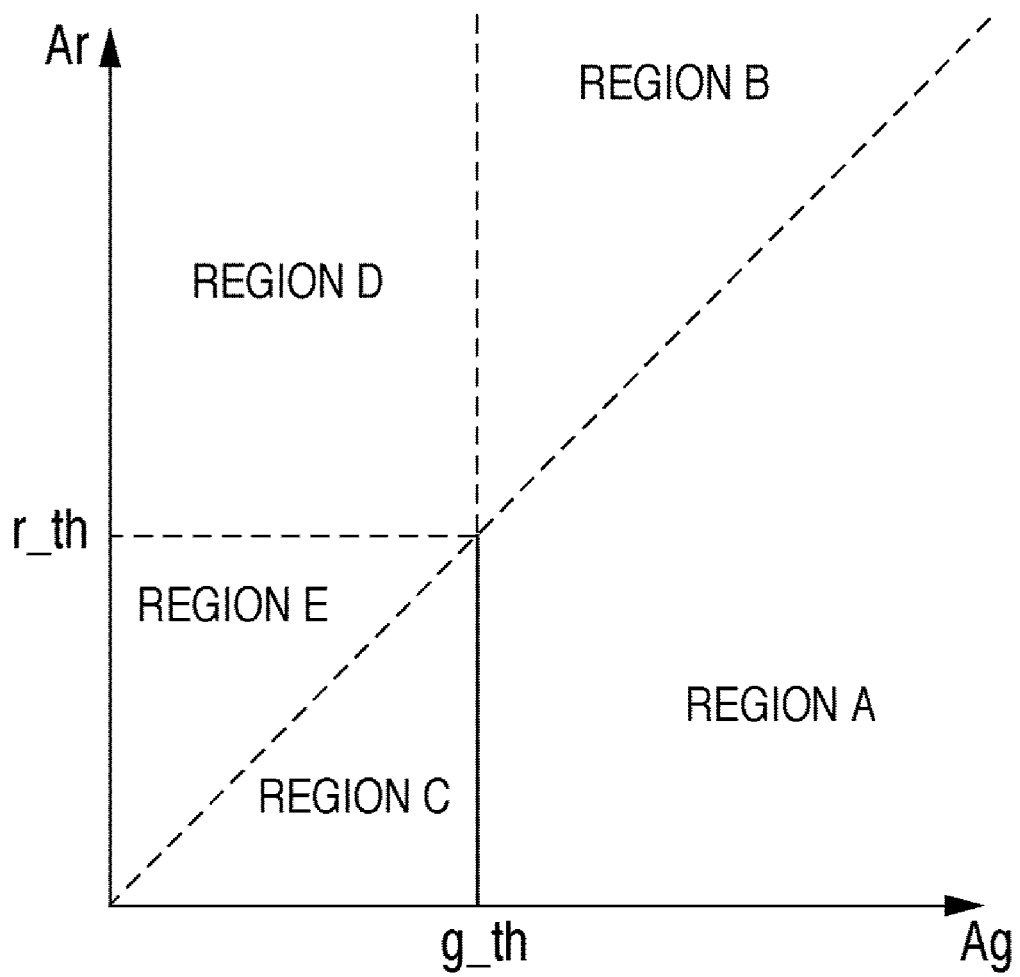
FIG. 6 is a graph showing a classification example of a gradient attribute of a pixel of interest in the image processing apparatus according to the first embodiment of the present invention.

As a result of the aforementioned decision method, the gradient attribute of a pixel of interest is classified, as shown in, for example, FIG. 6, depending on the gradient values Ag and Ar and thresholds g_th and r_th.

When the process advances to steps S804, S805, S806, S808, and S809, the gradient attribute is decided as falling within one or regions A, B, C, D, and E in FIG. 6, respectively. In a region in which the gradient value Ag of the reference image signal G is larger than the gradient value Ar of the suppression target image signal R, and the gradient value Ag of the reference image signal Ag is large, it is deduced that the probability of occurrence of color fringing is high. Conversely, in a region in which the gradient value Ag of the reference image signal G is small or a region in which the gradient value Ag of the reference image signal G is smaller than the gradient value Ar of the suppression target image signal R to some extent, it is deduced that the probability of occurrence of color fringing is low.

The decision method of the color fringing suppression coefficient in the first suppression coefficient computing unit 20 will be described below with reference to FIGS. 7A to 7C.

The first suppression coefficient computing unit 20 expresses the color fringing suppression coefficient Er as functions of the gradient values Ag and Ar and the thresholds g_th and r_th with respect to regions A to E classified based on the gradient attributes, for example, which functions are respectively given by:

[Region A]

$$Er=Ag\times\alpha \quad (3)$$

[Region B]

$$Er=\{(Ag-Ar)\times\beta+Ar\}\times\alpha \quad (4)$$

[Region C]

$$Er = \{(Ag - g\_th) \times \beta + g\_th\} \times \alpha \quad (5)$$

[Region D]

$$Er = \{(Ag - Ar) \times \beta + Ar\} \times \alpha \quad (6)$$

[Region E]

$$Er = \{(Ag - r\_th) \times \beta + r\_th\} \times \alpha \quad (7)$$

where Er=0 when Er<0, and α and β are arbitrary variables, as will be described later.

Figure 7A:
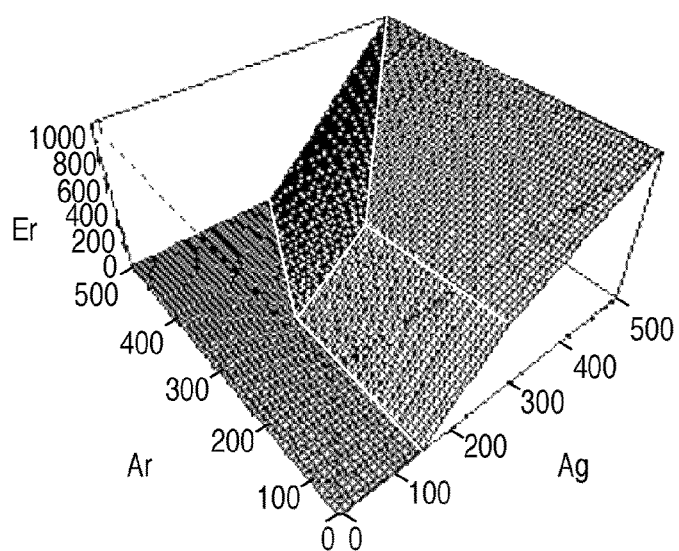
FIGS. 7A to 7C are views for explaining a determination method of a color fringing suppression coefficient of the first suppression coefficient computing unit 20 in the image processing apparatus according to the first embodiment of the present invention.
Figure 7B:
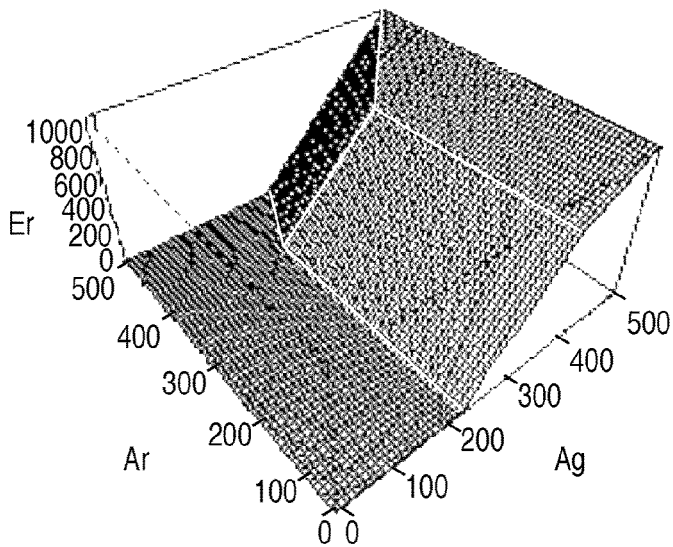
Figure 7C:
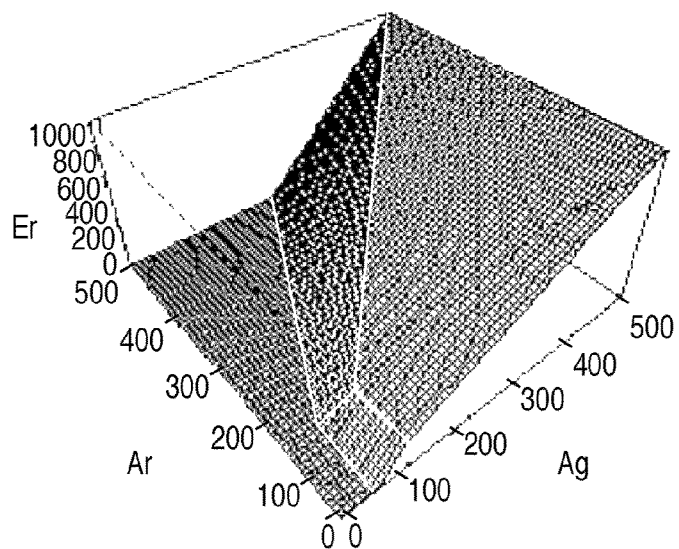

The color fringing suppression coefficient Er expressed by these equations defines three-dimensional characteristics with respect to an Ag–Ar plane, which change according to the thresholds g_th and r_th, as shown in FIGS. 7A to 7C. This color fringing suppression coefficient Er is set stepwise so that the degree of color fringing suppression becomes stronger (the value of the suppression coefficient Er is larger) for a pixel position where the probability of occurrence of color fringing is higher, and it becomes weaker (the value of the suppression coefficient Er is smaller) for a pixel position where the probability of occurrence of color fringing is lower.

When the thresholds g_th and r_th are increased with respect to the characteristics shown in FIG. 7A, a region of Er=0 is broadened in the Ag- and Ar-axis directions, as shown in FIG. 7B. That is, compared to the characteristics shown in FIG. 7A, the color fringing suppression effect in a region in which the gradient values Ag and Ar are small is reduced and, for example, an operation error for a color edge can be suppressed.

On the other hand, when the thresholds g_th and r_th are decreased with respect to the characteristics shown in FIG. 7A, a region of Er=0 is narrowed down in the Ag- and Ar-axis directions, as shown in FIG. 7C. That is, compared to the characteristics shown in FIG. 7A, color fringing suppression is to be executed even in a region in which the gradient values Ag and Ar are small, and color fringing suppression is applied to a low gradient part.

In equations (3) to (7), α and β are variables used to adjust the color fringing suppression strength. The output gain (in other words the rate of increase) of the color fringing suppression coefficient Er can be adjusted by adjusting the magnitude of α. Also, since the rising edge of the characteristics shown in FIGS. 7A to 7C (the angle of a slope of a trapezoidal solid) becomes steeper with increasing value β, the rate at which the color fringing suppression coefficient Er increases with respect to the gradient values Ag and Ar can be controlled. Independently of the threshold values, the size of a region where color-fringing suppression is skipped (the region of Er=0) can be controlled.

In this way, by adjusting the values of the thresholds g_th and r_th and the variables α and β according to the characteristics of an optical system, color fringing suppression can be applied to a low gradient portion and high gradient portion while preventing operation errors for color edges. For example, when the zoom state of the optical system is on the telephoto side, color fringing readily occurs compared to that on the wide-angle side. For this reason, the region of Er=0 is narrowed down step by step as the zoom state approaches the telephoto side from the wide-angle side, and the values of the thresholds g_th and r_th and the variables α and β are set to reduce the rate at which the color fringing suppression coefficient increases instead. On the other hand, when the aperture size of an aperture of the optical system is set to be large, since a region other than a principal object is unfocused, and it is deduced that the possibility of occurrence of color fringing is low, the region of Er=0 is set to be broad. Alternatively, when a photographing mode is set to be a sports mode or when a change in object is large, since color fringing is not conspicuous in the first place even when it occurs, the region of Er=0 is set to be extremely broad.

FIG. 8 is a block diagram showing an example of the arrangement of the first and second signal combining units 30 and 31.

The operations and arrangements of the first and second signal combining units 30 and 31 are common, except for only signals to be processed. For this reason, the following description will be given in association with the first signal combining unit 30. As for the second signal combining unit 31, "R" or "r" in the following description can be replaced by "B" or "b".

The color fringing suppression coefficient Er output from the first suppression coefficient computing unit 20 is normalized to a predetermined (or externally input) normalization level $Sr_{norm}$ by a normalizing unit 301. Furthermore, the normalized color fringing suppression coefficient Er is limited by a limiter 302 so that its value does not exceed 1.0, thus obtaining a combination coefficient Sr.

Figure 9A:
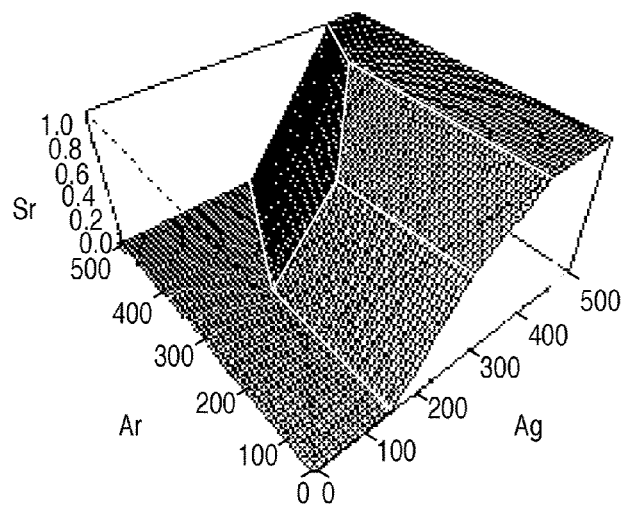
FIGS. 9A to 9C are views for explaining the relationship between the operation of a normalizing unit 301 and the characteristics of a combination coefficient Sr in the image processing apparatus according to the first embodiment of the present invention.
Figure 9B:
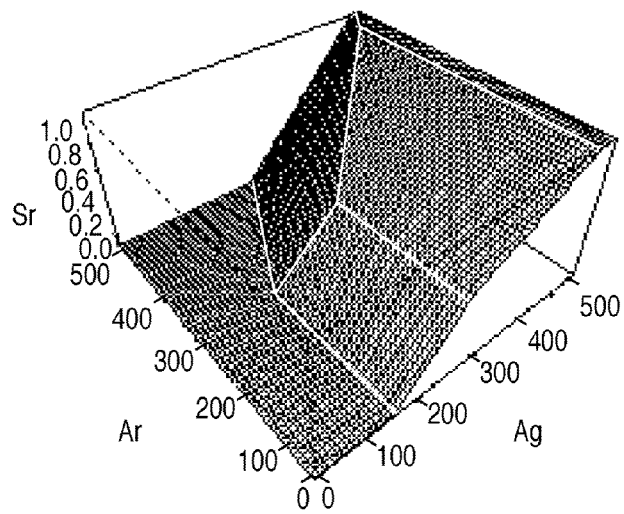
Figure 9C:
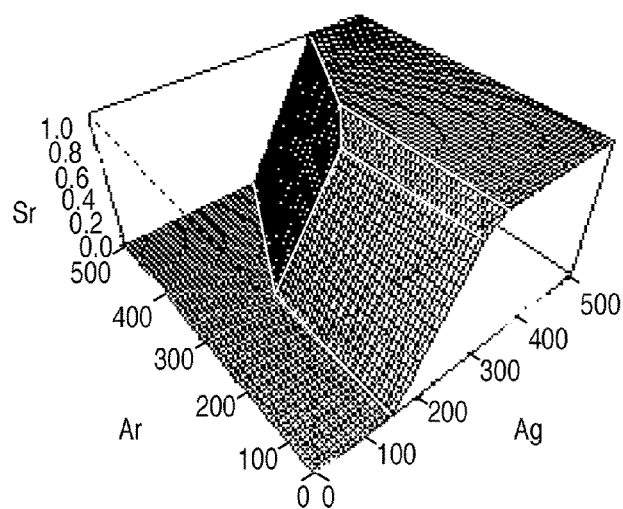

As a result of the processes of the normalizing unit 301 and limiter 302, the color fringing suppression coefficient Er obtained to have the function characteristics shown in FIG. 7A is converted into the combination coefficient Sr having the characteristics shown in FIGS. 9A to 9C.

Assume that FIG. 9A shows the characteristics obtained using a prescribed value of the normalization level $Sr_{norm}$. By setting the normalization level $Sr_{norm}$ to be larger than the prescribed value, the rising edge (the angle of a slope of a trapezoidal solid) of the combination coefficient Sr can be adjusted to be gentler, as shown in FIG. 9B. Also, a range (limit range) of the gradient values Ag and Ar where the combination coefficient Sr=1.0 can be narrowed down.

By setting the normalization level $Sr_{norm}$ to be smaller than the prescribed value, the rising edge (the angle of a slope of a trapezoidal solid) of the combination coefficient Sr can be adjusted to be steeper, as shown in FIG. 9C. Also, the range (limit range) of the gradient values Ag and Ar where the combination coefficient Sr=1.0 can be broadened. That is, a user can adjust a degree of the color fringing suppression according to his/her preference by changing the value of the normalization level $Sr_{norm}$. In other words, the user can adjust a degree of the color fringing suppression applied to pixels having a similar possibility of the color fringing by changing the value of the normalization level $Sr_{norm}$.

On the other hand, a subtractor 303 subtracts the suppression target image signal R from the reference image signal G, and a multiplier 304 multiplies a difference (G−R) by the combination coefficient Sr. Then, an adder 305 adds the suppression target image signal R to (G−R)×Sr, and outputs a signal R' obtained by applying the color fringing suppression processing to the suppression target image signal R.

The aforementioned arithmetic processing of the first signal combining unit 30 can be expressed as:

$$R' = \frac{Er}{Sr_{norm}}(G - R) + R \quad (8)$$

for $Sr = \frac{Er}{Sr_{norm}}$, and $Sr = 1.0$ when $Sr > 1.0$

The first signal combining unit 30 mixes the reference image signal G at a higher ratio as the combination coefficient Sr is higher (or in other words the influence of the reference signal G increases as Sr increases), and can consequently obtain an effect that the suppression target image signal R at the pixel of interest position becomes similar to the reference image signal G.

The second signal combining unit 31 applies the same processing to the suppression target image signal B. The second signal combining unit 31 mixes the reference image signal G at a higher ratio as a combination coefficient Sb is higher (or in other words the influence of the reference signal G increases as Sr increases), and can consequently obtain an effect that the suppression target image signal B at the pixel of interest position becomes similar to the reference image signal G.

The first and second signal combining units 30 and 31 control the values of the combination coefficients Sr and Sb to attain a weighted-combination so that the degree of color fringing suppression becomes stronger for a pixel position where the probability of occurrence of color fringing is higher, and becomes weaker for a pixel position where the probability of occurrence of color fringing is lower, as shown in FIGS. 9A to 9C.

Also, since the combination coefficient Sr is controlled to change the degree of suppression stepwise (continuously) in accordance with the probability of occurrence of color fringing, as shown in FIGS. 9A to 9C, color fringing can be suitably suppressed.

As described above, according to this embodiment, the gradient attribute each suppression target signal of a pixel of interest is classified into one of a plurality of regions in accordance with the magnitude relationship between the gradient values of the reference image signal and suppression target image signals, and the thresholds which are set in advance for these suppression target image signals. Then, a color fringing suppression coefficient, according to the region to which the gradient attribute belongs, is computed for each color signal of the pixel of interest. In this way, a problem that color fringing in a low gradient part (e.g. where the gradient values of the suppression target image signals are low) cannot be determined and correction becomes insufficient can be eliminated (in other words even in low gradient parts color fringing can be determined and corrected for) while also reducing the occurrence of a color edge part, where no color fringing occurs, being erroneously corrected for color fringing.

(Second Embodiment)

The second embodiment of the present invention will be described below.

Figure 10:
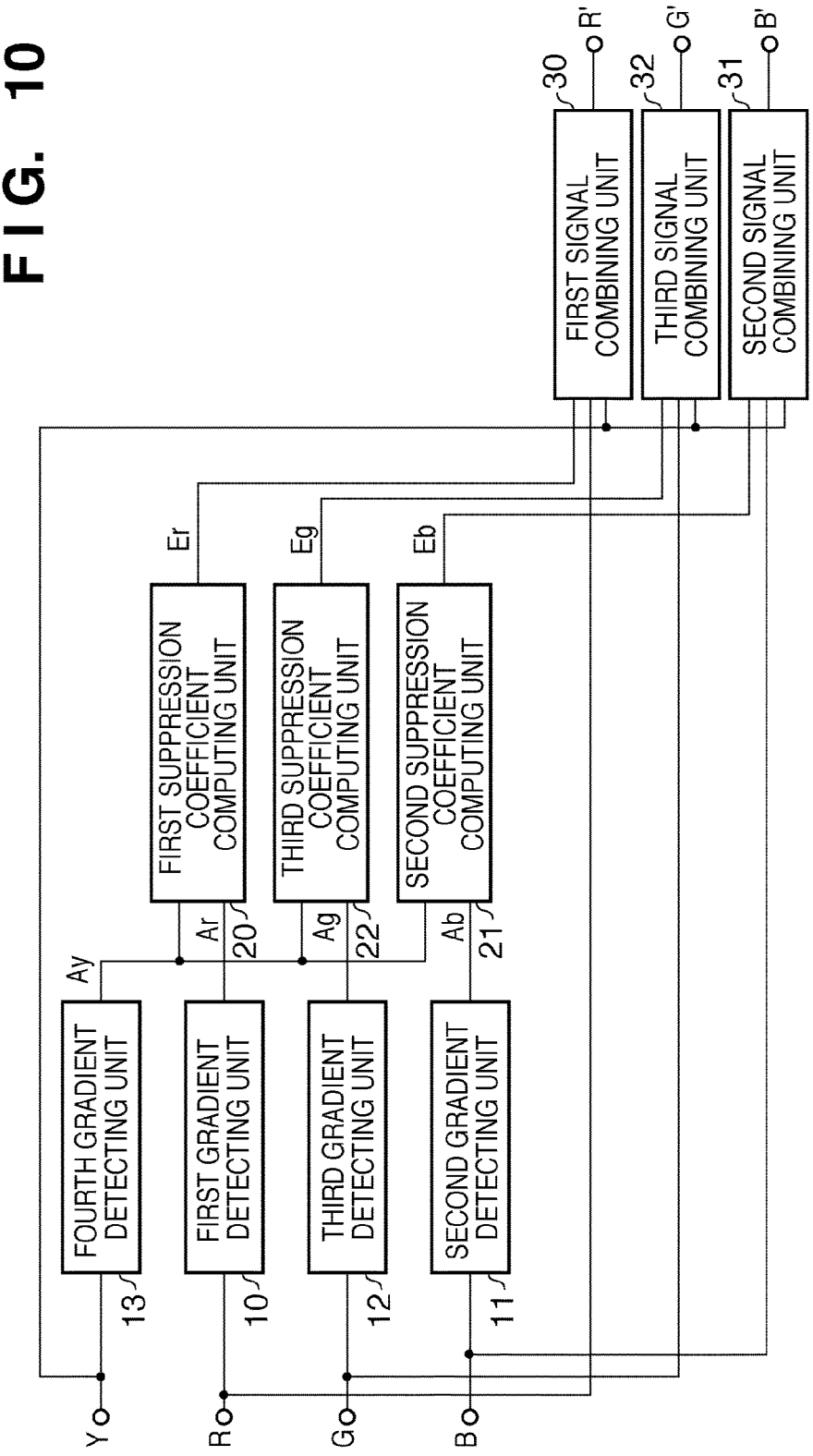
FIG. 10 is a block diagram showing an example of the arrangement of an image processing apparatus according to the second embodiment of the present invention.

FIG. 10 is a block diagram showing an example of the arrangement of an image processing apparatus according to the second embodiment of the present invention. In FIG. 10, the same reference numerals and symbols as in FIG. 1 denote components common to the image processing apparatus of the first embodiment, and a repetitive description thereof will be avoided.

As can be seen from comparison between FIGS. 1 and 10, this embodiment is different from the first embodiment in that since a luminance image signal Y is input, color fringing suppression processing is also applied to a G signal so the G signal is a suppression target image signal (whereas the G signal is not a color fringing suppression target image signal in the first embodiment).

An image signal obtained by a digital video camera, digital camera, or the like (not shown) is separated into R, G, and B image signals as in the first embodiment, and a Y image signal (luminance component image signal; to be referred to as Y hereinafter), which are then input to the image processing apparatus shown in FIG. 10.

In color fringing correction processing, an image signal such as a luminance signal having a color component in a wide band is used as a reference image signal, and image signals of other color components are used as suppression target image signals.

In the second embodiment, Y is used as a reference image signal, and R, G, and B are used as suppression target image signals.

R, B, G, and Y image signals are respectively input to first to fourth gradient detecting units 10, 11, 12, and 13, which respectively output corresponding gradient signals Ar, Ab, Ag, and Ay.

Of these signals, the gradient signals Ar and Ay are input to a first suppression coefficient computing unit 20. The first suppression coefficient computing unit 20 compares the gradient signals Ar and Ay, and outputs a color fringing suppression coefficient Er of the suppression target image signal R.

The gradient signals Ab and Ay are input to a second suppression coefficient computing unit 21. The second suppression coefficient computing unit 21 compares the gradient signals Ab and Ay, and outputs a color fringing suppression coefficient Eb of the suppression target image signal B.

The gradient signals Ag and Ay are input to a third suppression coefficient computing unit 22. The third suppression coefficient computing unit 22 compares the gradient signals Ag and Ay, and outputs a color fringing suppression coefficient Eg of the suppression target image signal G.

A first signal combining unit 30 receives the color fringing suppression coefficient Er, reference image signal Y, and suppression target image signal R. The first signal combining unit 30 weighted-combines the reference image signal Y and suppression target image signal R according to the color fringing suppression coefficient Er, and outputs a color fringing-suppressed suppression target image signal R'.

A second signal combining unit 31 receives the color fringing suppression coefficient Eb, reference image signal Y, and suppression target image signal B. The second signal combining unit 31 weighted-combines the reference image signal Y and suppression target image signal B according to the color fringing suppression coefficient Eb, and outputs a color fringing-suppressed suppression target image signal B'.

A third signal combining unit 32 receives the color fringing suppression coefficient Eg, reference image signal Y, and suppression target image signal G. The third signal combining unit 32 weighted-combines the reference image signal Y and suppression target image signal G according to the color fringing suppression coefficient Eg, and outputs a color fringing-suppressed suppression target image signal G'.

Since the arrangements of the first to fourth gradient detecting units 10 to 13, first to third suppression coefficient computing units 20 to 22, and first to third signal combining units 30 to 32 are as described in the first embodiment, a description thereof will not be given.

As for the operations, since the reference image signal is changed from G to Y, G, Ag, and g_th in the descriptions of these arrangements, equations, and figures in the first embodiment can be simply replaced by Y, Ay, and y_th, respectively.

In this embodiment, an effect of also attaining color fringing suppression for a G image signal can be realized in addition to the effects of the first embodiment.

(Third Embodiment)

The third embodiment of the present invention will be described below.

Figure 11:
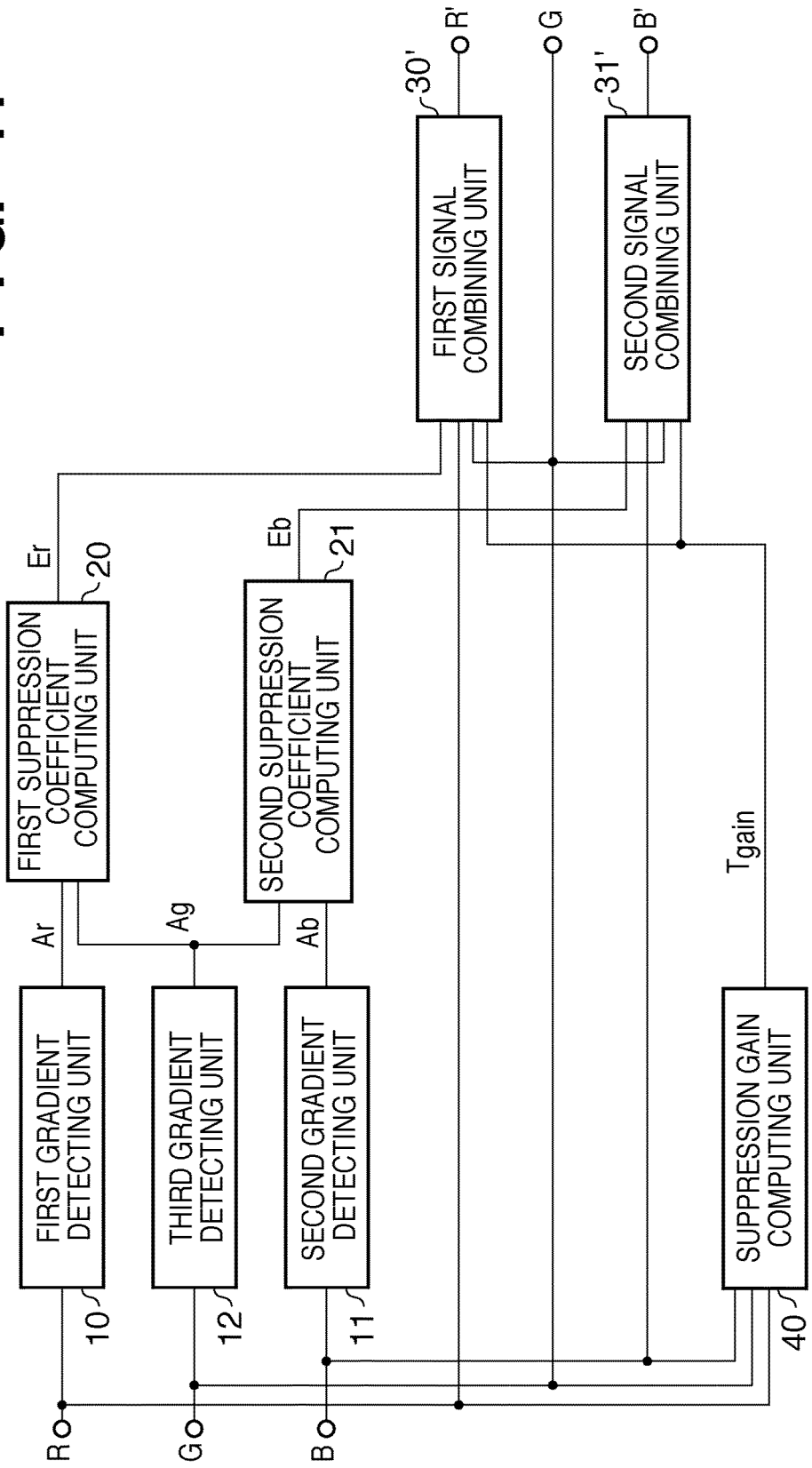
FIG. 11 is a block diagram showing an example of the arrangement of an image processing apparatus according to the third embodiment of the present invention.

FIG. 11 is a block diagram showing an example of the arrangement of an image processing apparatus according to the third embodiment of the present invention. In FIG. 11, the same reference numerals and symbols as in FIG. 1 denote components common to the image processing apparatus of the first embodiment, and a repetitive description thereof will be avoided.

As can be seen from comparison between FIGS. 1 and 11, this embodiment is different from the first embodiment in that a suppression gain computing unit 40 which controls first and second signal combining units 30' and 31' is newly added.

An image signal obtained by a digital video camera, digital camera, or the like (not shown) is separated into R (a red color component image signal; to be abbreviated as R hereinafter), G (a green color component image signal; to be abbreviated as G hereinafter), and B (a blue color component image signal; to be abbreviated as B hereinafter) as three primary colors. Then, these color component image signals are input to the image processing apparatus shown in FIG. 11.

In color fringing correction processing, an image signal such as a luminance signal having a color component in a wide band is used as a reference image signal, and image signals of other color components are used as suppression target image signals.

In the third embodiment, G is used as a reference image signal having a color component approximate to luminance, and R and B are used as suppression target image signals.

R, B, and G image signals are respectively input to first to third gradient detecting units 10, 11, and 12, which respectively output corresponding gradient signals Ar, Ab, and Ag.

Of these signals, the gradient signals Ar and Ag are input to a first suppression coefficient computing unit 20. The first suppression coefficient computing unit 20 compares the gradient signals Ar and Ag, and outputs a color fringing suppression coefficient Er of the suppression target image signal R.

The gradient signals Ab and Ag are input to a second suppression coefficient computing unit 21. The second suppression coefficient computing unit 21 compares the gradient signals Ab and Ag, and outputs a color fringing suppression coefficient Eb of the suppression target image signal B.

A suppression gain or factor computing unit 40 extracts information regarding hue, saturation, and value from the input R, G, and B image signals, and outputs a suppression gain $T_{gain}$ based on this information.

A first signal combining unit 30' receives the color fringing suppression coefficient Er, suppression gain $T_{gain}$, reference image signal G, and suppression target image signal R. The first signal combining unit 30' weighted-combines the reference image signal G and suppression target image signal R according to the suppression gain $T_{gain}$ and color fringing suppression coefficient Er, and outputs a color fringing-suppressed suppression target image signal R'.

A second signal combining unit 31' receives the color fringing suppression coefficient Eb, suppression gain $T_{gain}$, reference image signal G, and suppression target image signal B. The second signal combining unit 31' weighted-combines the reference image signal G and suppression target image signal B according to the suppression gain $T_{gain}$ and color fringing suppression coefficient Eb, and outputs a color fringing-suppressed suppression target image signal B'.

The reference image signal G is output intact without receiving any color fringing suppression processing in the first and second signal combining units 30' and 31'.

Since the arrangements of the first to third gradient detecting units 10 to 12 and first and second suppression coefficient computing units 20 and 21 are as described in the first embodiment, a description thereof will not be given.

Only the suppression gain computing unit 40 and first and second signal combining units 30' and 31' as differences from the first embodiment will be described in detail below.

Figure 12:
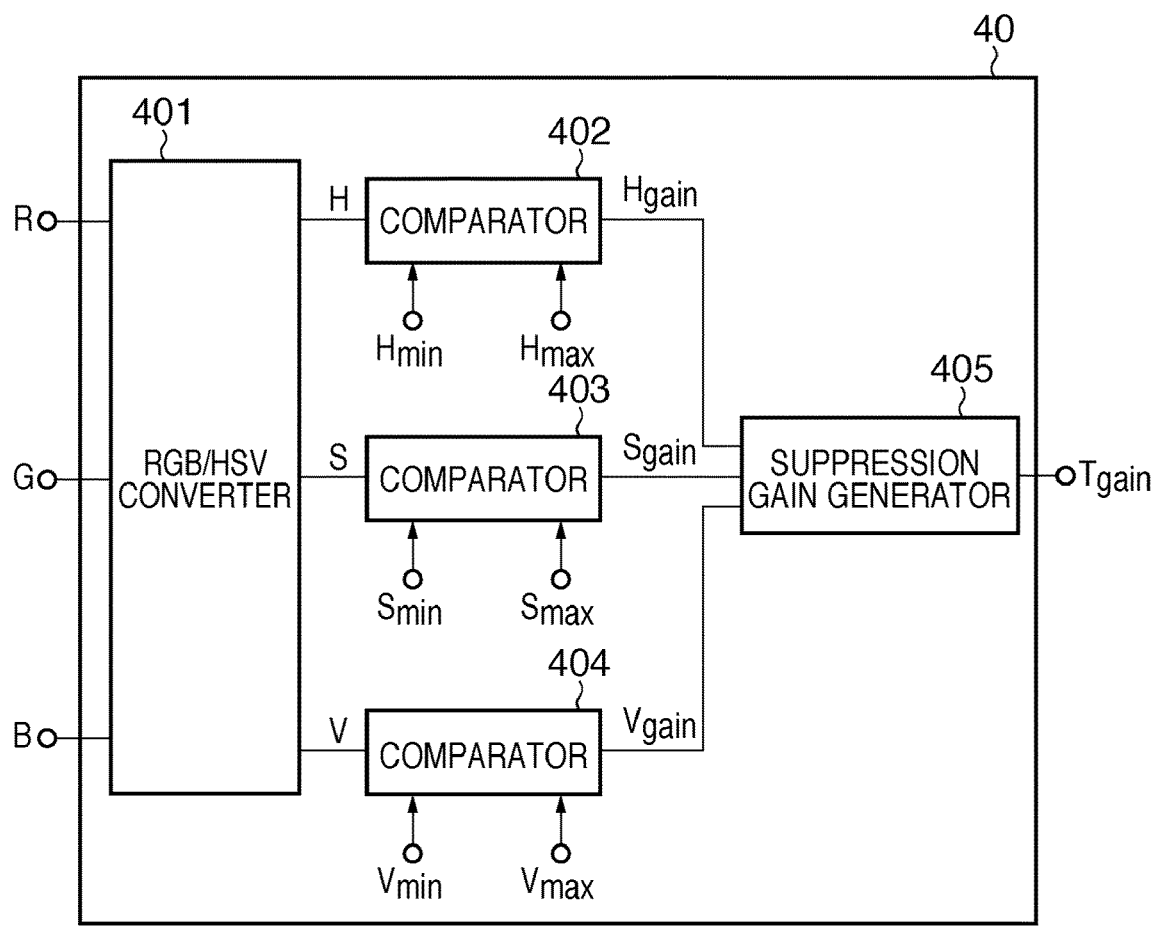
FIG. 12 is a block diagram showing an example of the arrangement of a suppression gain computing unit 40 in the image processing apparatus according to the third embodiment of the present invention.
Figure 13A:
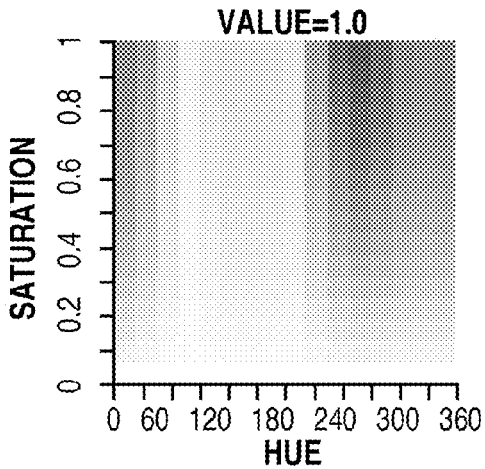
FIGS. 13A to 13E are views for explaining the operation of an RGB/HSV converter 401 in the image processing apparatus according to the third embodiment of the present invention.
Figure 13B:
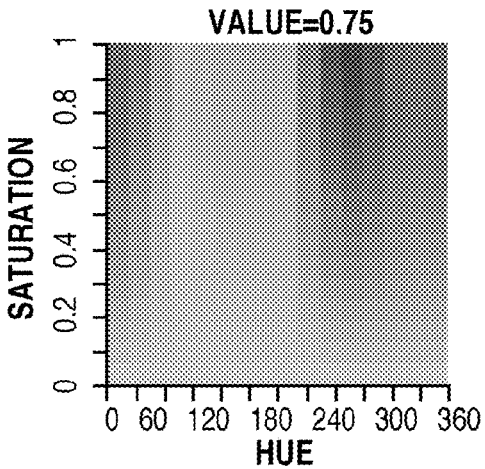
Figure 13C:
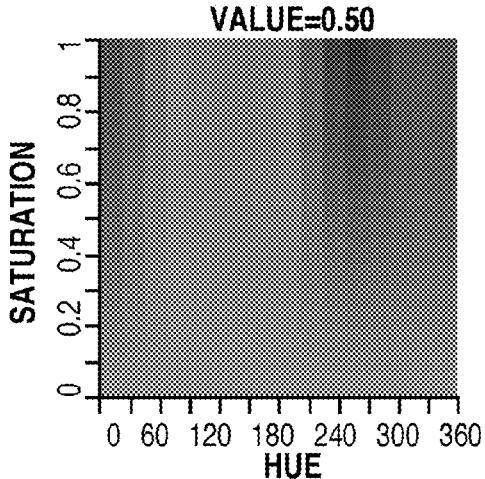
Figure 13D:
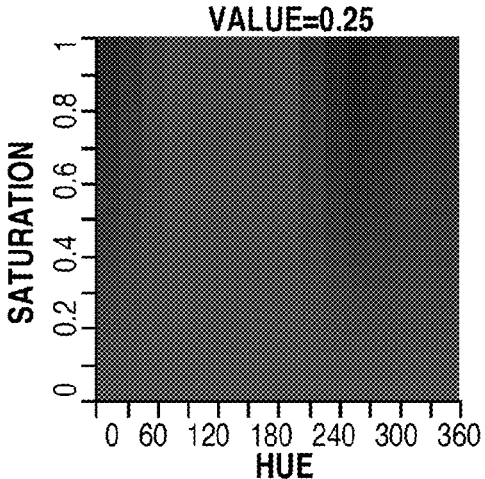
Figure 13E:
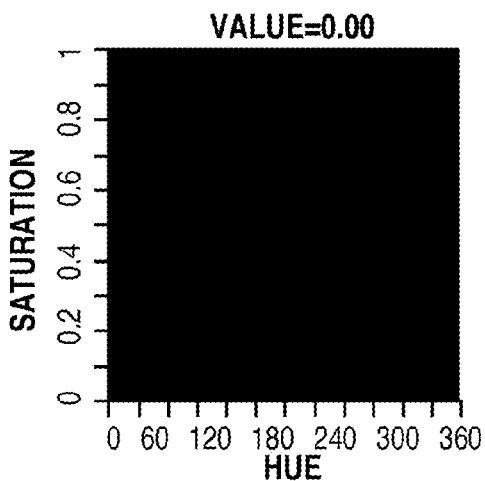

FIG. 12 is a block diagram showing an example of the arrangement of the suppression gain computing unit 40.

In the suppression gain computing unit 40, an RGB/HSV converter 401 converts the input R, G, and B image signals into an HSV format, and outputs a hue signal H, saturation signal S, and value signal V. The RGB/HSV converter 401 executes RGB-HSV conversion by, for example, the following arithmetic operations.

The RGB/HSV converter 401 computes a maximum value signal MAX and minimum value signal MIN of the R, G, and B image signals by:

$$MAX=\max(R,G,B) \qquad (9)$$

$$MIN=\min(R,G,B) \qquad (10)$$

The RGB/HSV converter 401 computes a hue signal H using one according to an image signal corresponding to the maximum value signal MAX of:
[When MAX=R]

$$H=60\times(G-B)/(MAX-MIN) \qquad (11)$$

[When MAX=G]

$$H=60\times(B-R)/(MAX-MIN)+120 \qquad (12)$$

[When MAX=B]

$$H=60\times(R-G)/(MAX-MIN)+240 \qquad (13)$$

The RGB/HSV converter 401 then computes a saturation signal S and value signal V based on the maximum value signal MAX and minimum value signal MIN by:

$$S=(MAX-MIN)/MAX \qquad (14)$$

$$V=MAX \qquad (15)$$

Since the hue signal H, saturation signal S, and value signal V, which are computed in this way, can classify color information in an HSV color space, as shown in FIGS. 13A to 13E, it can be determined whether or not the pixel of interest position is included in a desired color range such as green or flesh color.

Note that FIGS. 13A to 13E exemplify a case in which the hue signal H and saturation signal S are classified in 16 levels, and the value signal V is classified in 5 levels. However, these numbers of classifications are used for the sake of simplicity, and the present invention is not limited to such specific numbers of classifications.

A comparator 402 compares the hue signal H with a minimum value $H_{min}$ and maximum value $H_{max}$, which are set in advance or externally given. The comparator 402 outputs a suppression gain $H_{gain}$ according to a function which has characteristics shown in, for example, FIG. 15A with respect to the hue signal H at the pixel of interest position.

Within a range $H_{min} \leq H \leq H_{max}$, the suppression gain $H_{gain}=0$, and color fringing suppression processing is skipped. Therefore, the range of the hue signal H in which the color fringing suppression processing is to be executed can be controlled based on the setting values of $H_{min}$ and $H_{max}$.

A comparator 403 compares the saturation signal S with a minimum value $S_{min}$ and maximum value $S_{max}$, which are set in advance or externally given. The comparator 403 outputs a suppression gain $S_{gain}$ according to a function which has characteristics shown in, for example, FIG. 15B with respect to the saturation signal S at the pixel of interest position.

Within a range $S_{min} \leq S \leq S_{max}$, the suppression gain $S_{gain}=0$, and color fringing suppression processing is skipped. Therefore, the range of the saturation signal S in which the color fringing suppression processing is to be executed can be controlled based on the setting values of $S_{min}$ and $S_{max}$.

A comparator 404 compares the value signal V with a minimum value $V_{min}$ and maximum value $V_{max}$, which are set in advance or externally given. The comparator 404 outputs a suppression gain $V_{gain}$ according to a function which has characteristics shown in, e.g., FIG. 15C with respect to the value signal V at the pixel of interest position.

Within a range $V_{min} \leq V \leq V_{max}$, the suppression gain $V_{gain}=0$, and color fringing suppression processing is skipped. Therefore, the range of the value signal V in which the color fringing suppression processing is to be executed can be controlled based on the setting values of $V_{min}$ and $V_{max}$.

A suppression gain generator 405 computes and outputs a suppression gain $T_{gain}$ at the pixel of interest position from the suppression gains $H_{gain}$, $S_{gain}$, and $V_{gain}$. For example, the suppression gain generator 405 computes the suppression gain $T_{gain}$ by acquiring a maximum value of the suppression gains $H_{gain}$, $S_{gain}$, and $V_{gain}$ by $$T_{gain} = \max(H_{gain}, S_{gain}, V_{gain}) \quad (16)$$

by computing an average value of the suppression gains $H_{gain}$, $S_{gain}$, and $V_{gain}$ by $$T_{gain} = (H_{gain}, S_{gain}, V_{gain})/3 \quad (17)$$

or by weighted-combining the suppression gains $H_{gain}$, $S_{gain}$, and $V_{gain}$ by $$T_{gain} = a \cdot H_{gain} + b \cdot S_{gain} + c \cdot V_{gain} \quad (18)$$

(for a+b+c=1)

Note that the method of deciding the hue, saturation, and value using the HSV color space has been explained. However, such a method is merely an example, and the hue, saturation, and value may be decided using other color spaces such as an HLS color space and L*a*b* color space.

Figure 14:
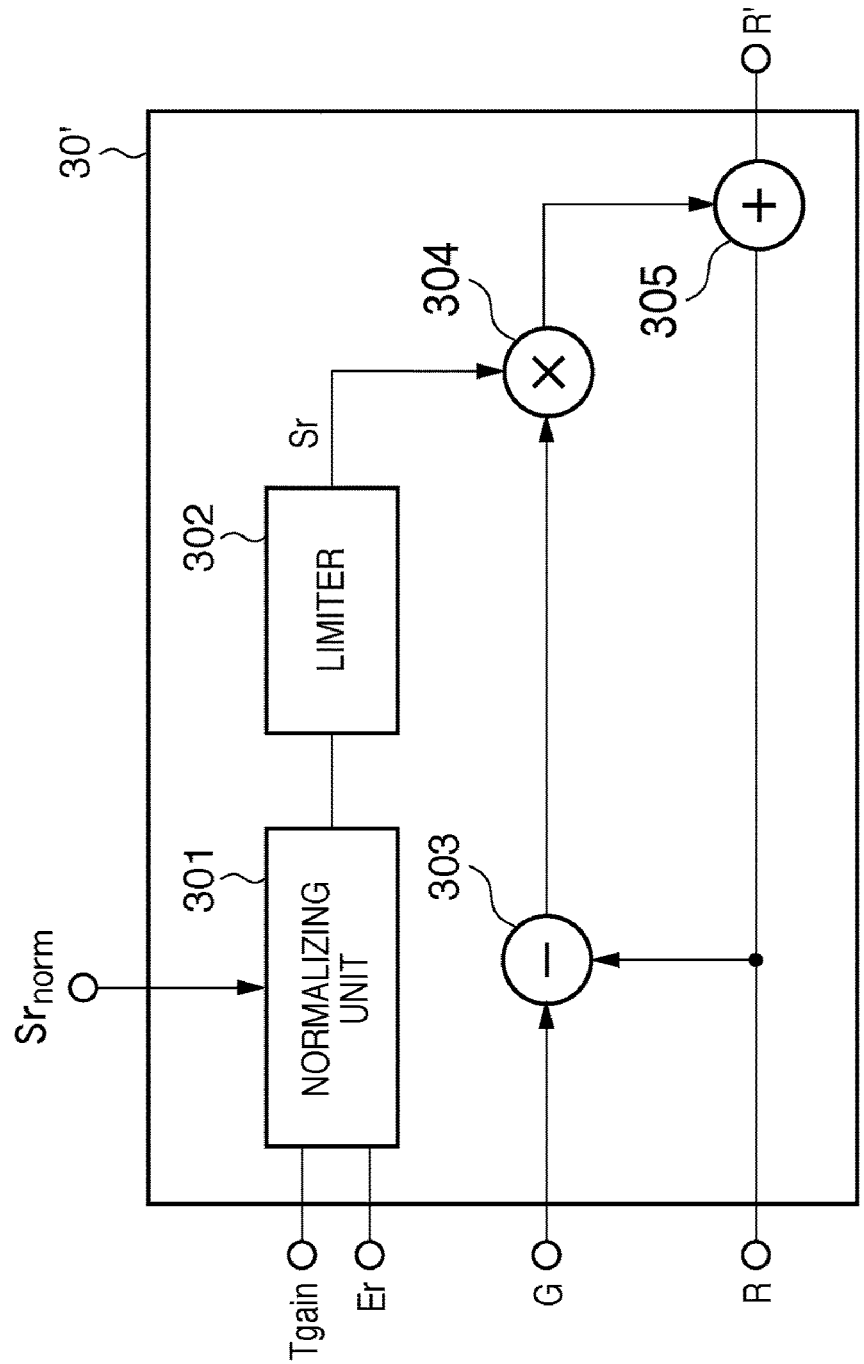
FIG. 14 is a block diagram showing an example of the arrangement of first and second signal combining units 30' and 31' in the image processing apparatus according to the third embodiment of the present invention.

FIG. 14 is a block diagram showing an example of the arrangement of the first and second signal combining units 30' and 31'. FIG. 14 shows the first signal combining unit 30' as a representative, but the second signal combining unit 31' has the same arrangement.

The arrangement and operation of the first signal combining unit 30' will be described below. In case of the second signal combining unit 31', R or r in the following description can be replaced by B or b.

The first signal combining unit 30' receives the suppression gain $T_{gain}$, color fringing suppression coefficient Er, reference image signal G, and suppression target image signal R. Of these signals, the suppression gain $T_{gain}$ and color fringing suppression coefficient Er are input to a normalizing unit 301. The normalizing unit 301 multiplies the color fringing suppression coefficient Er by the suppression gain $T_{gain}$, and normalizes the product by a normalization level $Sr_{norm}$, which is set in advance or externally input. A limiter 302 limits the normalization result so as not to exceed 1.0, and outputs the limiting result as a combination coefficient Sr.

As a result of the normalization processing, the color fringing suppression coefficient Er obtained to have the function characteristics shown in FIG. 7A is converted into the combination coefficient Sr having the function characteristics shown in FIGS. 9A to 9C while receiving suppression control with respect to a specific color.

Assume that FIG. 9A shows the characteristics obtained using a prescribed value of the normalization level $Sr_{norm}$. By setting the normalization level $Sr_{norm}$ to be larger than the prescribed value, the rising edge (the angle of a slope of a trapezoidal solid) of the combination coefficient Sr can be adjusted to be gentler, as shown in FIG. 9B. Also, a range (limit range) of the gradient values Ag and Ar where the combination coefficient Sr=1.0 can be narrowed down.

By setting the normalization level $Sr_{norm}$ to be smaller than the prescribed value, the rising edge (the angle of a slope of a trapezoidal solid) of the combination coefficient Sr can be adjusted to be steeper, as shown in FIG. 9C. Also, the range (limit range) of the gradient values Ag and Ar where the combination coefficient Sr=1.0 can be broadened.

When the suppression gain $T_{gain}$ is zero, the color fringing suppression processing at the pixel of interest position is skipped. A color region where the suppression gain $T_{gain}$ is zero is smoothly controlled in association with the hue H, saturation S, and value V, as shown in FIGS. 15A to 15C.

On the other hand, a subtractor 303 subtracts the suppression target image signal R from the reference image signal G, and a multiplier 304 multiplies a difference (G−R) by the combination coefficient Sr. Then, an adder 305 adds the suppression target image signal R to (G−R)×Sr, and outputs a signal R' obtained by applying the color fringing suppression processing to the suppression target image signal R.

The aforementioned arithmetic processing of the first signal combining unit 30' can be expressed as:

$$R' = \frac{Er \cdot T_{gain}}{Sr_{norm}}(G-R) + R \quad (19)$$

for $Sr = 1.0$ when $Sr = \frac{Er \cdot T_{gain}}{Sr_{norm}} > 1.0$

The first signal combining unit 30' mixes the reference image signal G at a higher ratio as the combination coefficient Sr is higher, and can consequently obtain an effect that the suppression target image signal R at the pixel of interest position becomes similar to the reference image signal G.

The second signal combining unit 31' applies the same processing to the suppression target image signal B. The second signal combining unit 31' mixes the reference image signal G at a higher ratio as a combination coefficient Sb is higher, and can consequently obtain an effect that the suppression target image signal B at the pixel of interest position becomes similar to the reference image signal G.

The suppression target image signals R' and B' obtained in this way can apply the color fringing suppression processing by specifying a pixel position where the probability of occurrence of color fringing is high, and can also control not to apply the color fringing suppression processing to a specific color. For this reason, color fringing can be suitably suppressed.

(Fourth Embodiment)

The fourth embodiment of the present invention will be described below.

Figure 16:
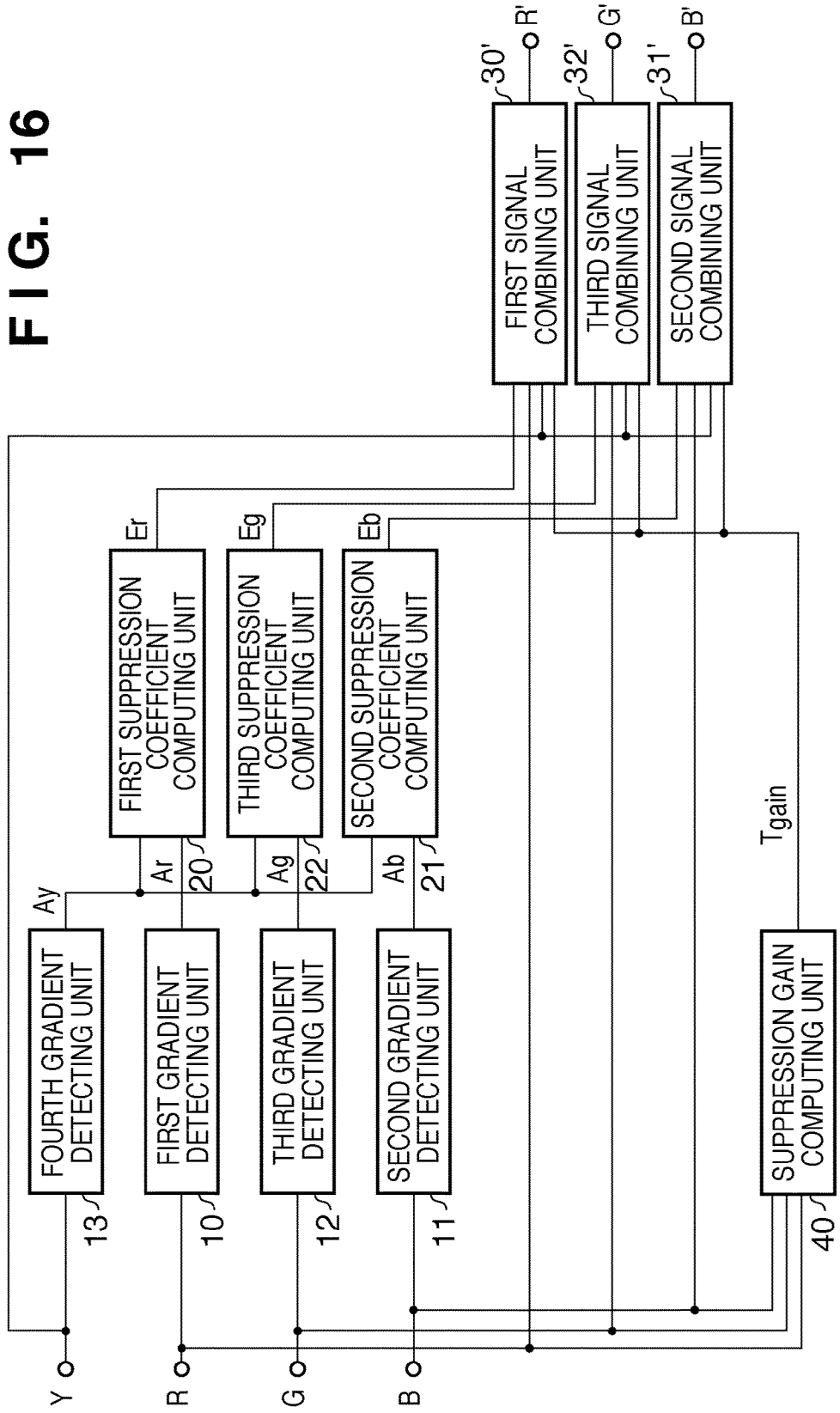
FIG. 16 is a block diagram showing an example of the arrangement of an image processing apparatus according to the fourth embodiment of the present invention.

FIG. 16 is a block diagram showing an example of the arrangement of an image processing apparatus according to the fourth embodiment of the present invention. In FIG. 16, the same reference numerals and symbols as in FIG. 11 denote components common to the image processing apparatus of the third embodiment, and a repetitive description thereof will be avoided.

As can be seen from comparison between FIGS. 11 and 16, this embodiment is different from the third embodiment in that since a luminance image signal Y is input, color fringing suppression processing is also applied to a G signal which is not a color fringing suppression target image signal in the third embodiment.

An image signal obtained by a digital video camera, digital camera, or the like (not shown) is separated into R, G, and B image signals as in the first embodiment, and a Y image signal (luminance component image signal; to be referred to as Y hereinafter), which are then input to the image processing apparatus shown in FIG. 16.

In color fringing correction processing, an image signal such as a luminance signal having a color component in a wide band is used as a reference image signal, and image signals of other color components are used as suppression target image signals.

In the fourth embodiment, Y is used as a reference image signal, and R, G, and B are used as suppression target image signals.

R, B, G, and Y image signals are respectively input to first to fourth gradient detecting units 10, 11, 12, and 13, which respectively output corresponding gradient signals Ar, Ab, Ag, and Ay.

Of these signals, the gradient signals Ar and Ay are input to a first suppression coefficient computing unit 20. The first suppression coefficient computing unit 20 compares the gradient signals Ar and Ay, and outputs a color fringing suppression coefficient Er of the suppression target image signal R.

The gradient signals Ab and Ay are input to a second suppression coefficient computing unit 21. The second suppression coefficient computing unit 21 compares the gradient signals Ab and Ay, and outputs a color fringing suppression coefficient Eb of the suppression target image signal B.

The gradient signals Ag and Ay are input to a third suppression coefficient computing unit 22. The third suppression coefficient computing unit 22 compares the gradient signals Ag and Ay, and outputs a color fringing suppression coefficient Eg of the suppression target image signal G.

A suppression gain computing unit 40 extracts pieces of information of hue, saturation, and value from the input R, G, and B image signals, and outputs a suppression gain $T_{gain}$ based on these pieces of information.

A first signal combining unit 30' receives the color fringing suppression coefficient Er, suppression gain $T_{gain}$, reference image signal Y, and suppression target image signal R. The first signal combining unit 30' weighted-combines the reference image signal Y and suppression target image signal R according to the suppression gain $T_{gain}$ and color fringing suppression coefficient Er, and outputs a color fringing-suppressed suppression target image signal R'.

A second signal combining unit 31' receives the color fringing suppression coefficient Eb, suppression gain $T_{gain}$, reference image signal Y, and suppression target image signal B. The second signal combining unit 31' weighted-combines the reference image signal Y and suppression target image signal B according to the suppression gain $T_{gain}$ and color fringing suppression coefficient Eb, and outputs a color fringing-suppressed suppression target image signal B'.

A third signal combining unit 32' receives the color fringing suppression coefficient Eg, suppression gain $T_{gain}$, reference image signal Y, and suppression target image signal G. The third signal combining unit 32' weighted-combines the reference image signal Y and suppression target image signal G according to the suppression gain $T_{gain}$ and color fringing suppression coefficient Eg, and outputs a color fringing-suppressed suppression target image signal G'.

Since the arrangements of the first to third gradient detecting units 10 to 12 and first and second suppression coefficient computing units 20 and 21 are as described in the first embodiment, a description thereof will not be given.

Also, since the suppression gain computing unit 40 and the first and second signal combining units 30' and 31' are as described in the third embodiment, a description thereof will not be given. Since the third signal combining unit 32' has the same arrangement as the first and second signal combining units 30' and 31', a description thereof will not be given.

As for the operations, since the reference image signal is changed from G to Y, G, Ag, and g_th in the descriptions of these arrangements, equations, and figures in the third embodiment can be simply replaced by Y, Ay, and y_th, respectively.

In this embodiment, an effect of also attaining color fringing suppression for a G image signal can be realized in addition to the effects of the third embodiment.

(Fifth Embodiment)

The fifth embodiment of the present invention will be described below.

Figure 17:
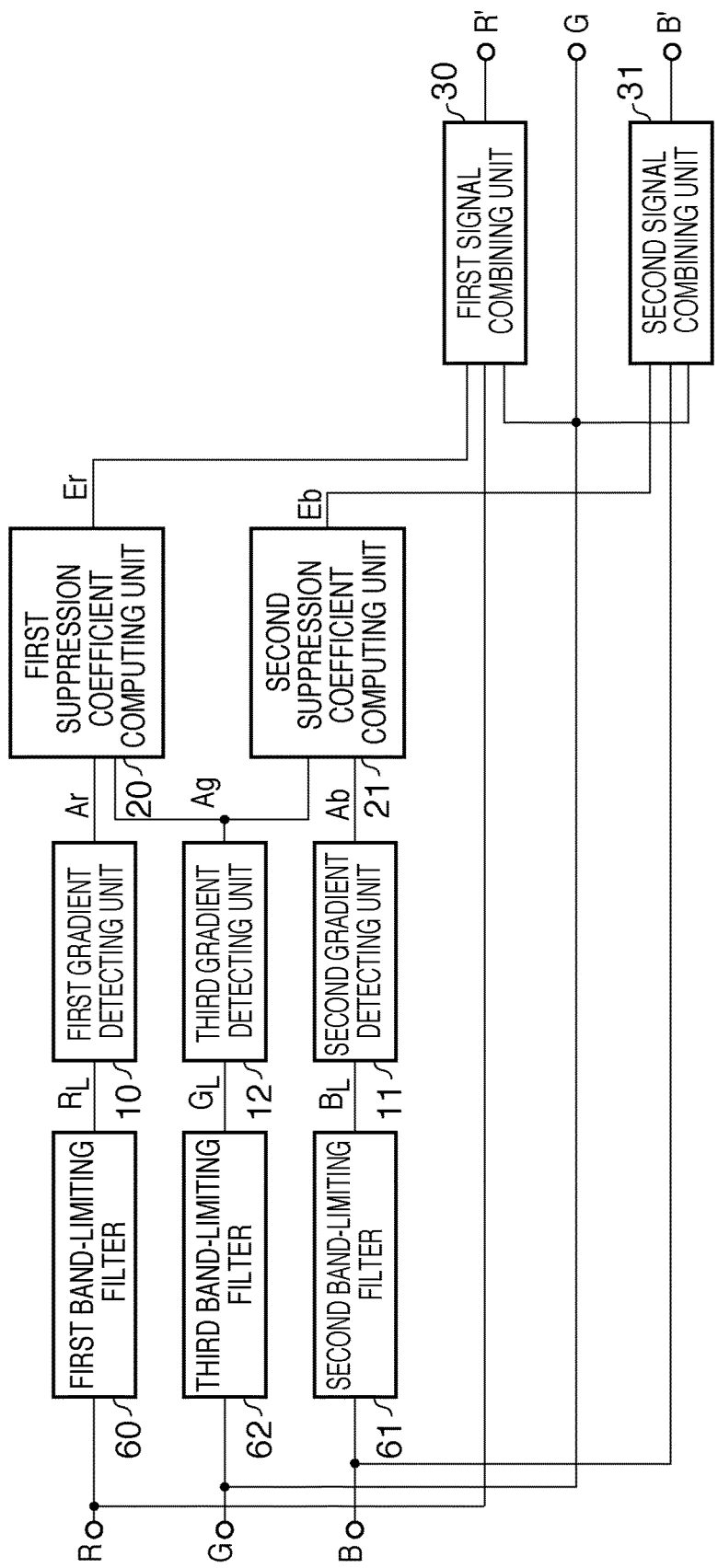
FIG. 17 is a block diagram showing an example of the arrangement of an image processing apparatus according to the fifth embodiment of the present invention.

FIG. 17 is a block diagram showing an example of the arrangement of an image processing apparatus according to the fifth embodiment of the present invention. In FIG. 17, the same reference numerals and symbols as in FIG. 1 denote components common to the image processing apparatus of the first embodiment, and a repetitive description thereof will be avoided.

As can be seen from comparison between FIGS. 1 and 17, this embodiment is different from the first embodiment in that first to third band-limiting filters 60 to 62 are arranged before first to third gradient detecting units 10 to 12.

By controlling the frequency characteristics of the first to third band-limiting filters 60 to 62, regions where gradient signals are to be detected can be controlled.

An image signal obtained by a digital video camera, digital camera, or the like (not shown) is separated into R, G, and B image signals as three primary colors. These image signals are then input to the image processing apparatus shown in FIG. 17.

In color fringing correction processing, an image signal such as a luminance signal having a color component in a wide band is used as a reference image signal, and image signals of other color components are used as suppression target image signals.

In the fifth embodiment, G is used as a reference image signal having a color component approximate to luminance, and R and B are used as suppression target image signals.

R, B, and G image signals are respectively input to the first to third band-limiting filters 60 to 62, and are converted into, for example, image signals RL, BL, and GL whose frequency bands are limited to low-frequency domains.

The RL, BL, and GL image signals are respectively input to the first to third gradient detecting units 10 to 12, which respectively output corresponding gradient signals Ar, Ab, and Ag.

Of these signals, the gradient signals Ar and Ag are input to a first suppression coefficient computing unit 20. The first suppression coefficient computing unit 20 compares the gradient signals Ar and Ag, and outputs a color fringing suppression coefficient Er of the suppression target image signal R.

The gradient signals Ab and Ag are input to a second suppression coefficient computing unit 21. The second suppression coefficient computing unit 21 compares the gradient signals Ab and Ag, and outputs a color fringing suppression coefficient Eb of the suppression target image signal B.

A first signal combining unit 30 receives the color fringing suppression coefficient Er, reference image signal G, and suppression target image signal R. The first signal combining unit 30 weighted-combines the reference image signal G and suppression target image signal R according to the color fringing suppression coefficient Er, and outputs a color fringing-suppressed suppression target image signal R'.

A second signal combining unit 31 receives the color fringing suppression coefficient Eb, reference image signal G, and suppression target image signal B. The second signal combining unit 31 weighted-combines the reference image signal G and suppression target image signal B according to the color fringing suppression coefficient Eb, and outputs a color fringing-suppressed suppression target image signal B'.

The reference image signal G is output intact without receiving any color fringing suppression processing in the first and second signal combining units 30 and 31.

Since the arrangements of the first to third gradient detecting units 10 to 12, first and second suppression coefficient computing units 20 and 21, and first and second signal combining units 30 and 31 are as described in the first embodiment, a description thereof will not be repeated.

Only the first to third band-limiting filters 60 to 62 as the differences from the first embodiment will be described in detail below.

The first to third band-limiting filters 60, 61, and 62 are general FIR digital LPFs (finite impulse response low-pass filters). In this embodiment, assume that the first to third band-limiting filters 60, 61, and 62 can be set with one of three passing frequency characteristics a to c shown in, e.g., FIG. 18A by externally changing their filter coefficients.

Figure 18A:
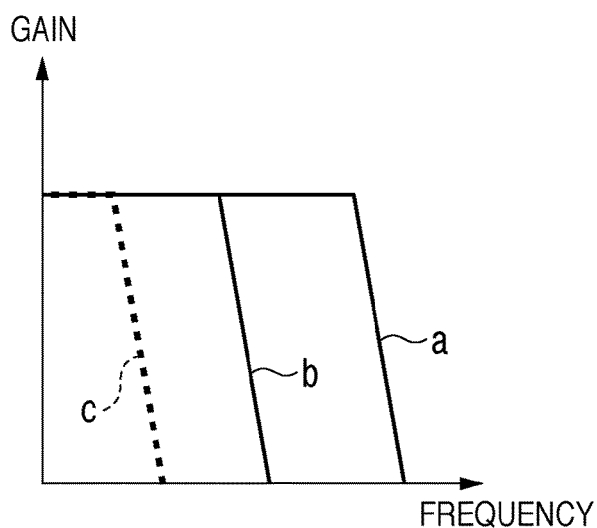
FIG. 18A is a graph showing an example of the passing frequency characteristics of first to third band-limiting filters 60, 61, and 62 in the image processing apparatus according to the fifth embodiment of the present invention.
Figure 18B:
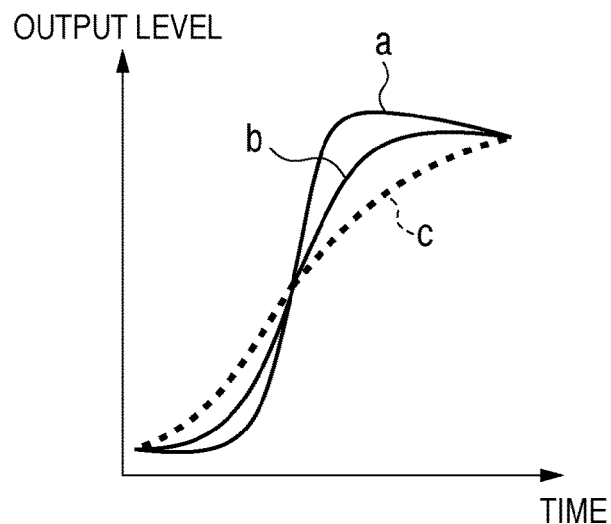
FIG. 18B is a graph showing an example of output waveforms obtained by inputting a step edge waveform to the band-limiting filters having the passing frequency characteristics shown in FIG. 18A.

FIG. 18B shows an example of output waveforms a to c obtained when a step edge waveform is input to the band-limiting filters having the passing frequency characteristics a to c shown in FIG. 18A.

By narrowing down a passing band from a to c in FIG. 18A toward a low-frequency band, the rising edge of an output step edge waveform becomes gentler as the band is narrowed down, as shown in a to c in FIG. 18B.

By narrowing down the passing frequency bands of the first to third band-limiting filters 60 to 62, gradient values can be obtained within the wide range near the step edge waveform. On the other hand, by broadening the passing frequency bands, the output resolutions of gradient values can be enhanced.

Since color fringing readily occurs near the step edge waveform, the application ranges and coefficient precisions of the color fringing suppression coefficient outputs of the first and second suppression coefficient computing units 20 and 21 can be adjusted by adjusting the passing frequency bands of the first to third band-limiting filters 60 to 62.

Figure 18C:
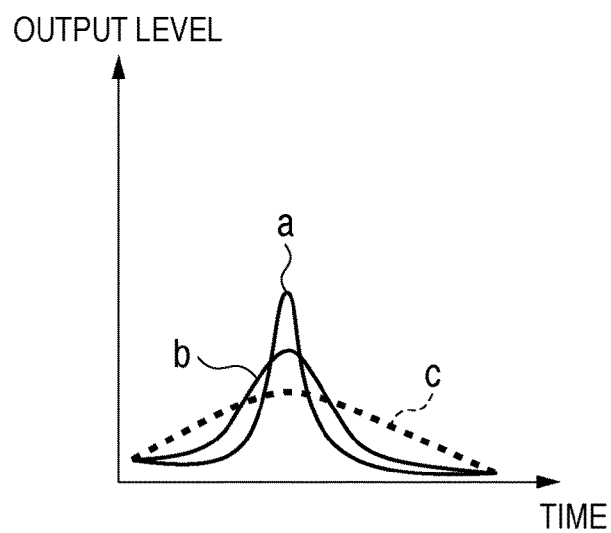
FIG. 18C is a graph showing an example of changes in gradient signal by the band-limiting filters having the passing frequency characteristics shown in FIG. 18A.

The arrangements and operations of the first to third gradient detecting units 10 to 12 are as described in the first embodiment. However, by adjusting the passing frequency characteristics of the first to third band-limiting filters 60 to 62, the gradient signals Ar, Ab, and Ag change. For example, the gradient signals Ar, Ab, and Ag change, as indicated by a to c in FIG. 18C in correspondence with the passing frequency characteristics a to c in FIG. 18A.

According to this embodiment, by arranging the band-limiting filters of image signals from which gradient signals are to be detected, the application ranges and coefficient precisions of color fringing suppression coefficient outputs can be adjusted. For this reason, color fringing can be suppressed with higher precision than the first embodiment.

(Sixth Embodiment)

The sixth embodiment of the present invention will be described below.

Figure 19:
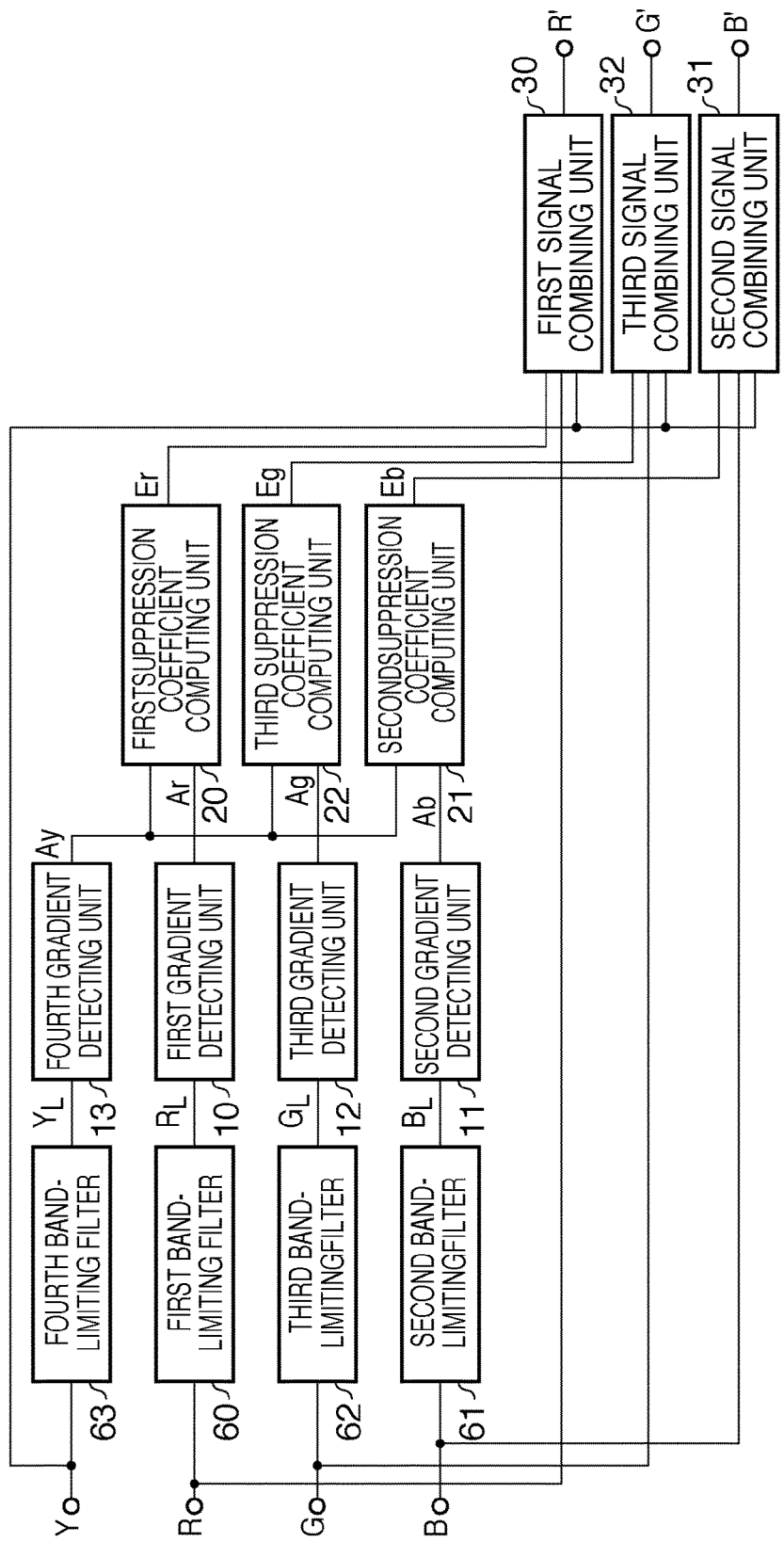
FIG. 19 is a block diagram showing an example of the arrangement of an image processing apparatus according to the sixth embodiment of the present invention.

FIG. 19 is a block diagram showing an example of the arrangement of an image processing apparatus according to the sixth embodiment of the present invention. In FIG. 19, the same reference numerals and symbols as in FIG. 10 denote components common to the image processing apparatus of the second embodiment, and a repetitive description thereof will be avoided.

As can be seen from comparison between FIGS. 10 and 19, this embodiment is different from the second embodiment in that first to fourth band-limiting filters 60 to 63 are arranged before first to fourth gradient detecting units 10 to 13.

By controlling the frequency characteristics of the first to fourth band-limiting filters 60 to 63, regions where gradient signals are to be detected can be controlled.

An image signal obtained by a digital video camera, digital camera, or the like (not shown) is separated into R, G, and B image signals as in the first embodiment, and a Y image signal (luminance component image signal), which are then input to the image processing apparatus shown in FIG. 19.

In color fringing correction processing, an image signal such as a luminance signal having a color component in a wide band is used as a reference image signal, and image signals of other color components are used as suppression target image signals.

In the sixth embodiment, Y is used as a reference image signal, and R, G, and B are used as suppression target image signals.

R, B, G, and Y image signals are respectively input to the first to fourth band-limiting filters 60 to 63, and are converted into, for example, image signals RL, BL, GL, and YL whose frequency bands are limited to low-frequency domains.

The RL, BL, GL, and YL image signals are respectively input to the first to fourth gradient detecting units 10 to 13, which respectively output corresponding gradient signals Ar, Ab, Ag, and Ay.

Of these signals, the gradient signals Ar and Ay are input to a first suppression coefficient computing unit 20. The first suppression coefficient computing unit 20 compares the gradient signals Ar and Ay, and outputs a color fringing suppression coefficient Er of the suppression target image signal R.

The gradient signals Ab and Ay are input to a second suppression coefficient computing unit 21. The second suppression coefficient computing unit 21 compares the gradient signals Ab and Ay, and outputs a color fringing suppression coefficient Eb of the suppression target image signal B.

The gradient signals Ag and Ay are input to a third suppression coefficient computing unit 22. The third suppression coefficient computing unit 22 compares the gradient signals Ag and Ay, and outputs a color fringing suppression coefficient Eg of the suppression target image signal G.

A first signal combining unit 30 receives the color fringing suppression coefficient Er, reference image signal Y, and suppression target image signal R. The first signal combining unit 30 weighted-combines the reference image signal Y and suppression target image signal R according to the color fringing suppression coefficient Er, and outputs a color fringing-suppressed suppression target image signal R'.

A second signal combining unit 31 receives the color fringing suppression coefficient Eb, reference image signal Y, and suppression target image signal B. The second signal combining unit 31 weighted-combines the reference image signal Y and suppression target image signal B according to the color fringing suppression coefficient Eb, and outputs a color fringing-suppressed suppression target image signal B'.

A third signal combining unit 32 receives the color fringing suppression coefficient Eg, reference image signal Y, and suppression target image signal G. The third signal combining unit 32 weighted-combines the reference image signal Y and suppression target image signal G according to the color fringing suppression coefficient Eg, and outputs a color fringing-suppressed suppression target image signal G'.

Since the arrangements of the first to fourth gradient detecting units 10 to 13, first to third suppression coefficient computing units 20 to 22, and first to third signal combining units 30 to 32 are as described in the first embodiment, a description thereof will not be given.

As for the operations, since the reference image signal is changed from G to Y, G, Ag, and g_th in the descriptions of these arrangements, equations, and figures in the first embodiment can be simply replaced by Y, Ay, and y_th, respectively.

Since the arrangements and operations of the first to third band-limiting filters 60 to 62 are as described in the fifth embodiment, a description thereof will not be repeated. Also, since both the arrangement and operation of the fourth band-limiting filter 63 can be the same as those of the first to third band-limiting filters 60 to 62, a description thereof will not be given.

According to this embodiment, an effect of also attaining color fringing suppression for a G image signal with higher precision can be realized in addition to the effects of the fifth embodiment.

(Seventh Embodiment)

The seventh embodiment of the present invention will be described below.

Figure 20:
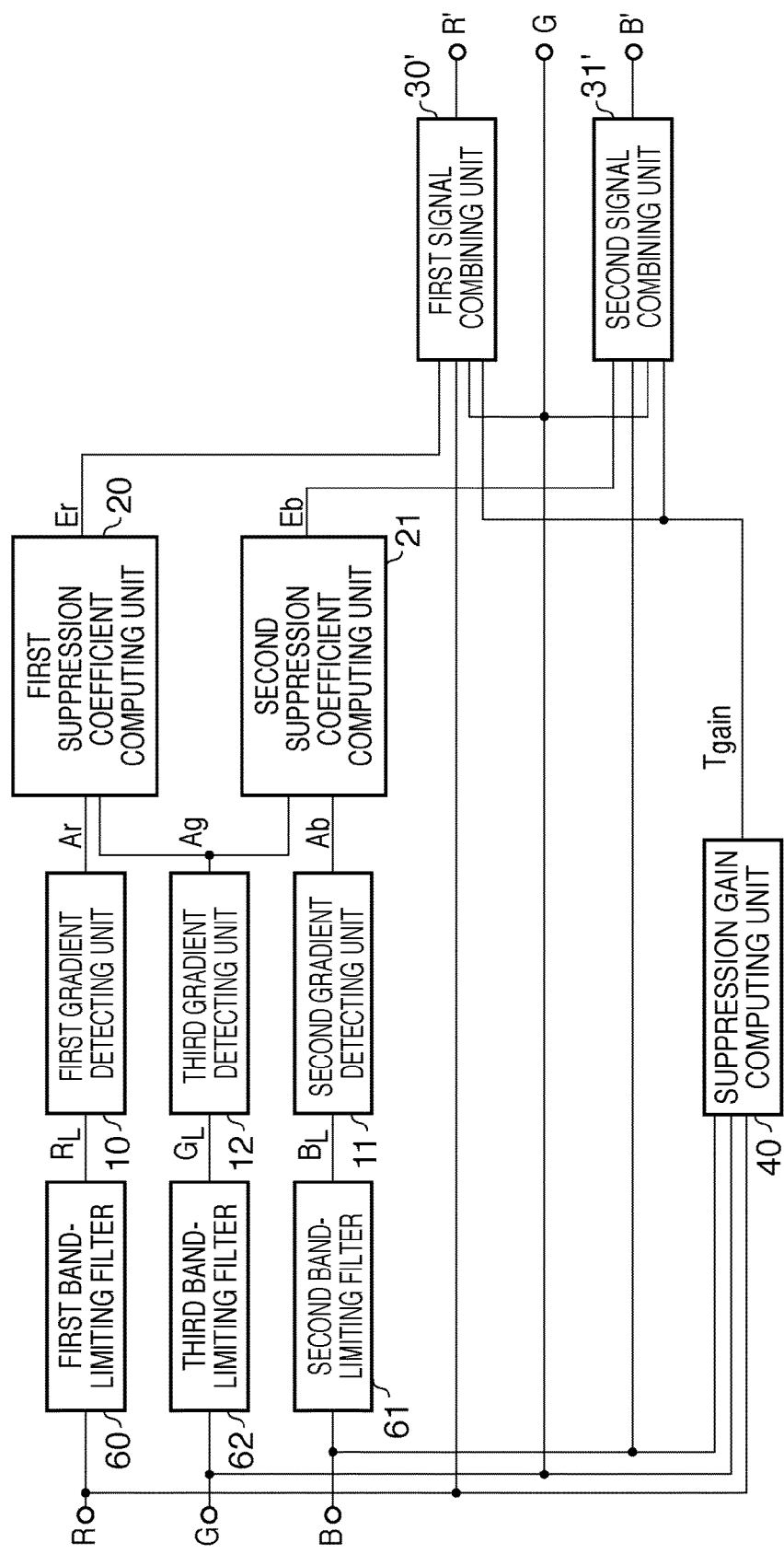
FIG. 20 is a block diagram showing an example of the arrangement of an image processing apparatus according to the seventh embodiment of the present invention.

FIG. 20 is a block diagram showing an example of the arrangement of an image processing apparatus according to the seventh embodiment of the present invention. In FIG. 20, the same reference numerals and symbols as in FIG. 11 denote components common to the image processing apparatus of the third embodiment, and a repetitive description thereof will be avoided.

As can be seen from comparison between FIGS. 11 and 20, this embodiment is different from the third embodiment in that first to third band-limiting filters 60 to 62 are arranged before first to third gradient detecting units 10 to 12.

By controlling the frequency characteristics of the first to third band-limiting filters 60 to 62, regions where gradient signals are to be detected can be controlled.

An image signal obtained by a digital video camera, digital camera, or the like (not shown) is separated into R, G, and B image signals as three primary colors. These image signals are then input to the image processing apparatus shown in FIG. 20.

In color fringing correction processing, an image signal such as a luminance signal having a color component in a wide band is used as a reference image signal, and image signals of other color components are used as suppression target image signals.

In the seventh embodiment, G is used as a reference image signal having a color component approximate to luminance, and R and B are used as suppression target image signals.

R, B, and G image signals are respectively input to the first to third band-limiting filters 60 to 62, and are converted into, for example, image signals RL, BL, and GL whose frequency bands are limited to low-frequency domains.

The RL, BL, and GL image signals are respectively input to the first to third gradient detecting units 10 to 12, which respectively output corresponding gradient signals Ar, Ab, and Ag.

Of these signals, the gradient signals Ar and Ag are input to a first suppression coefficient computing unit 20. The first suppression coefficient computing unit 20 compares the gradient signals Ar and Ag, and outputs a color fringing suppression coefficient Er of the suppression target image signal R.

The gradient signals Ab and Ag are input to a second suppression coefficient computing unit 21. The second suppression coefficient computing unit 21 compares the gradient signals Ab and Ag, and outputs a color fringing suppression coefficient Eb of the suppression target image signal B.

A suppression gain computing unit 40 extracts pieces of information of hue, saturation, and value from the input R, G, and B image signals, and outputs a suppression gain $T_{gain}$ based on these pieces of information.

A first signal combining unit 30' receives the color fringing suppression coefficient Er, suppression gain $T_{gain}$, reference image signal G, and suppression target image signal R. The first signal combining unit 30' weighted-combines the reference image signal G and suppression target image signal R according to the suppression gain $T_{gain}$ and color fringing suppression coefficient Er, and outputs a color fringing-suppressed suppression target image signal R'.

A second signal combining unit 31' receives the color fringing suppression coefficient Eb, suppression gain $T_{gain}$, reference image signal G, and suppression target image signal B. The second signal combining unit 31' weighted-combines the reference image signal G and suppression target image signal B according to the suppression gain $T_{gain}$ and color fringing suppression coefficient Eb, and outputs a color fringing-suppressed suppression target image signal B'.

The reference image signal G is output intact without receiving any color fringing suppression processing in the first and second signal combining units 30' and 31'.

Since the arrangements of the first to third gradient detecting units 10 to 12 and first and second suppression coefficient computing units 20 and 21 are as described in the first embodiment, a description thereof will not be repeated.

Also, since the arrangements and operations of the suppression gain computing unit 40 and first and second signal combining units 30' and 31' are as described in the third embodiment, a description thereof will not be repeated.

Furthermore, since the arrangements and operations of the first to third band-limiting filters 60 to 62 are as described in the fifth embodiment, a description thereof will not be repeated.

According to this embodiment, by arranging the band-limiting filters of image signals from which gradient signals are to be detected, the application ranges and coefficient precisions of color fringing suppression coefficient outputs can be adjusted. For this reason, color fringing can be suppressed with higher precision than the third embodiment.

(Eighth Embodiment)

The eighth embodiment of the present invention will be described below.

Figure 21:
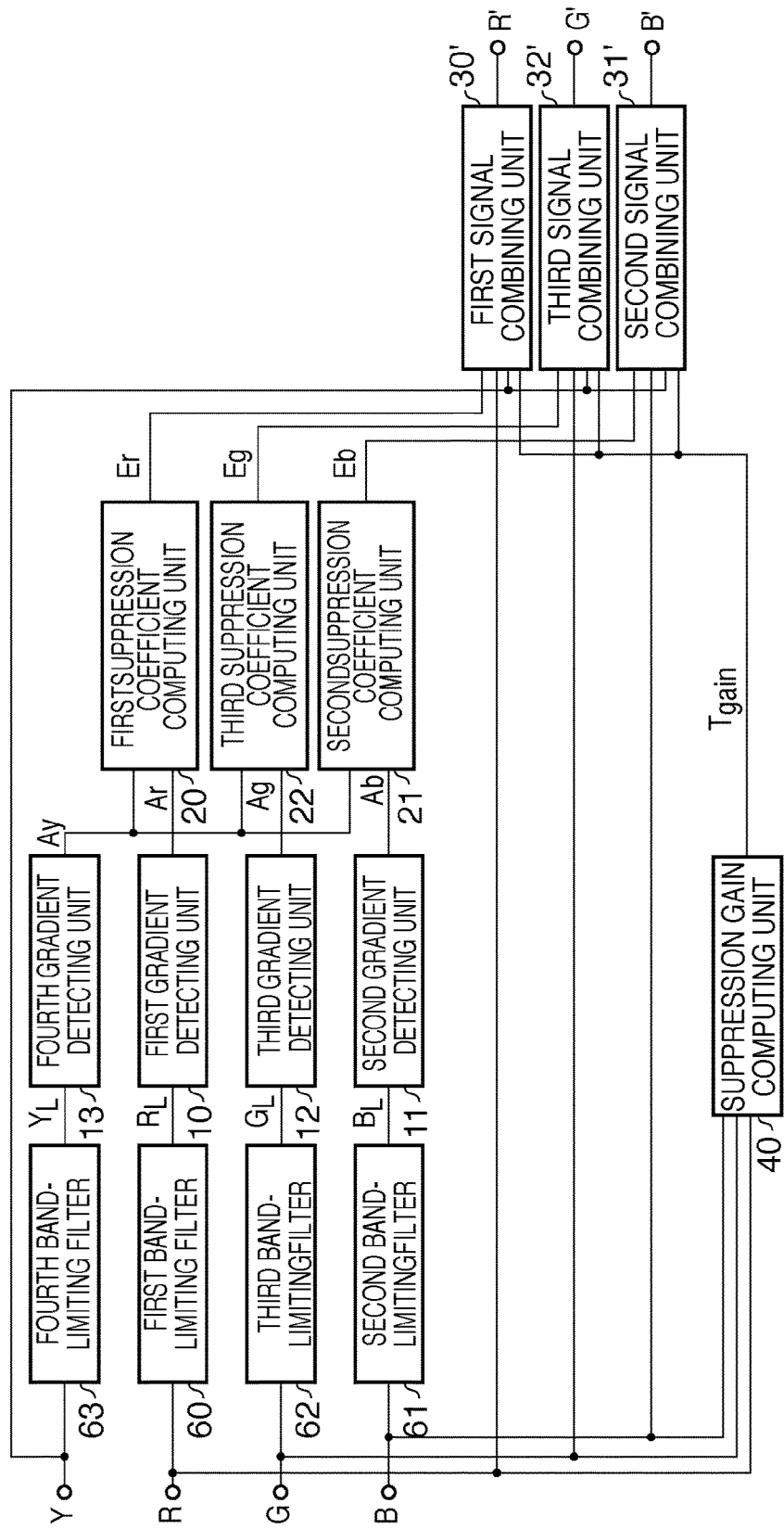
FIG. 21 is a block diagram showing an example of the arrangement of an image processing apparatus according to the eighth embodiment of the present invention.

FIG. 21 is a block diagram showing an example of the arrangement of an image processing apparatus according to the eighth embodiment of the present invention. In FIG. 21, the same reference numerals and symbols as in FIG. 16 denote components common to the image processing apparatus of the fourth embodiment, and a repetitive description thereof will be avoided.

As can be seen from comparison between FIGS. 16 and 21, this embodiment is different from the fourth embodiment in that first to fourth band-limiting filters 60 to 63 are arranged before first to fourth gradient detecting units 10 to 13.

By controlling the frequency characteristics of the first to fourth band-limiting filters 60 to 63, regions where gradient signals are to be detected can be controlled.

An image signal obtained by a digital video camera, digital camera, or the like (not shown) is separated into R, G, and B image signals as in the first embodiment, and a Y image signal (luminance component image signal), which are then input to the image processing apparatus shown in FIG. 21.

In color fringing correction processing, an image signal such as a luminance signal having a color component in a wide band is used as a reference image signal, and image signals of other color components are used as suppression target image signals.

In the eighth embodiment, Y is used as a reference image signal, and R, G, and B are used as suppression target image signals.

R, B, G, and Y image signals are respectively input to the first to fourth band-limiting filters 60 to 63, and are converted into, for example, image signals RL, BL, GL, and YL whose frequency bands are limited to low-frequency domains.

The RL, BL, GL, and YL image signals are respectively input to the first to fourth gradient detecting units 10 to 13, which respectively output corresponding gradient signals Ar, Ab, Ag, and Ay.

Of these signals, the gradient signals Ar and Ay are input to a first suppression coefficient computing unit 20. The first suppression coefficient computing unit 20 compares the gradient signals Ar and Ay, and outputs a color fringing suppression coefficient Er of the suppression target image signal R.

The gradient signals Ab and Ay are input to a second suppression coefficient computing unit 21. The second suppression coefficient computing unit 21 compares the gradient signals Ab and Ay, and outputs a color fringing suppression coefficient Eb of the suppression target image signal B.

The gradient signals Ag and Ay are input to a third suppression coefficient computing unit 22. The third suppression coefficient computing unit 22 compares the gradient signals Ag and Ay, and outputs a color fringing suppression coefficient Eg of the suppression target image signal G.

A suppression gain computing unit 40 extracts pieces of information of hue, saturation, and value from the input R, G, and B image signals, and outputs a suppression gain $T_{gain}$ based on these pieces of information.

A first signal combining unit 30' receives the color fringing suppression coefficient Er, suppression gain $T_{gain}$, reference image signal Y, and suppression target image signal R. The first signal combining unit 30' weighted-combines the reference image signal Y and suppression target image signal R according to the suppression gain $T_{gain}$ and color fringing suppression coefficient Er, and outputs a color fringing-suppressed suppression target image signal R'.

A second signal combining unit 31' receives the color fringing suppression coefficient Eb, suppression gain $T_{gain}$, reference image signal Y, and suppression target image signal B. The second signal combining unit 31' weighted-combines the reference image signal Y and suppression target image signal B according to the suppression gain $T_{gain}$ and color fringing suppression coefficient Eb, and outputs a color fringing-suppressed suppression target image signal B'.

A third signal combining unit 32' receives the color fringing suppression coefficient Eg, suppression gain $T_{gain}$, reference image signal Y, and suppression target image signal G. The third signal combining unit 32' weighted-combines the reference image signal Y and suppression target image signal G according to the suppression gain $T_{gain}$ and color fringing suppression coefficient Eg, and outputs a color fringing-suppressed suppression target image signal G'.

Since the arrangements of the first to third gradient detecting units 10 to 12 and first and second suppression coefficient computing units 20 and 21 are as described in the first embodiment, a description thereof will not be repeated.

Since the suppression gain computing unit 40 and first and second signal combining units 30' and 31' are as described in the third embodiment, a description thereof will not be repeated. Also, since the third signal combining unit 32' has the same arrangement as the first and second signal combining units 30' and 31', a description thereof will not be given.

As for the operations, since the reference image signal is changed from G to Y, G, Ag, and g_th in the descriptions of these arrangements, equations, and figures in the third embodiment can be simply replaced by Y, Ay, and y_th, respectively.

Furthermore, since the arrangements and operations of the first to third band-limiting filters 60 to 62 are as described in the fifth embodiment, a description thereof will not be repeated. Also, since the fourth band-limiting filter 63 has the same arrangement as the first to third band-limiting filters 60 to 62, a description thereof will not be given.

According to this embodiment, a G image signal can also undergo color fringing suppression with higher precision than the seventh embodiment in addition to the effects of the seventh embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). The program may be carried on a carrier medium such as a computer readable storage medium or transmission medium (signal).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-335230 filed on Dec. 26, 2008, and 2009-266768, filed on Nov. 24, 2009, which are hereby incorporated by reference herein their entirety.

What is claimed is:

1. An image processing apparatus for suppressing color fringing of an image defined by a plurality of pixels, comprising:
   a reference gradient detecting unit adapted to detect a gradient from an image signal of a luminance component or one of color components of a pixel, which is used as a reference image signal, and output a reference gradient signal;
   a suppression target gradient detecting unit adapted to detect gradients of image signals of color components different from the reference image signal of the pixel, which are used as suppression target image signals, and output suppression target gradient signals;
   a suppression coefficient computing unit adapted to compute color fringing suppression coefficients of the respective suppression target image signals of the pixel, based on the reference gradient signal and the suppression target gradient signals; and
   a combining unit adapted to combine each of the suppression target image signals of the pixel with the reference image signal by weighting the reference image signal based on the color fringing suppression coefficients, and output the combined signals as image signals of the color components in which the color fringing is suppressed, wherein said suppression coefficient computing unit defines a plurality of regions in accordance with magnitude relationships between values of the reference gradient signal and the suppression target gradient signals, allocates a function in advance to each of the regions and computes the color fringing suppression coefficients of the respective suppression target image signals of the pixel by classifying the respective suppression target image signals into one of the plurality of regions and using the respective function allocated to that region to compute the color fringing suppression coefficient.

2. The apparatus according to claim 1, wherein said suppression coefficient computing unit computes a color fringing suppression coefficient such that the reference image signal has a greater weighting in said combining means as the reference gradient signal increases.

3. The apparatus according to claim 1, further comprising:
a suppression gain computing unit adapted to compute, in accordance with hue, saturation, and value of that pixel, a suppression gain used to adjust a degree of color fringing suppression applied to the pixel, wherein said suppression coefficient computing unit computes the color fringing suppression coefficients using the suppression gain in addition to the reference gradient signal and the suppression target gradient signals.

4. The apparatus according to claim 1, further comprising filters which are arranged before said reference gradient detecting unit and said suppression target gradient detecting unit, for limiting frequency bands of the suppression target image signals to predetermined low-frequency domains.

5. The apparatus according to claim 1, wherein the reference image signal is a green color component image signal of the pixel, and the suppression target image signals are red and blue color component image signals of the pixel.

6. The apparatus according to claim 1, wherein the reference image signal is a luminance component image signal of the pixel, and the suppression target image signals are red, green, and blue color component image signals of the pixel.

7. The apparatus according to claim 1, wherein said reference gradient detecting unit and said suppression target gradient detecting unit respectively compute the reference gradient signal and the suppression target gradient signals for the pixel by combining horizontal gradient values and vertical gradient values for the reference image signals and suppression target image signals of a plurality of pixels included in a square region having the pixel as a center.

8. An image processing method for suppressing color fringing of an image defined by a plurality of pixels, comprising:
a reference gradient detecting step of detecting a gradient from an image signal of a luminance component or one of color components of a pixel, which is used as a reference image signal, and outputting a reference gradient signal;

a suppression target gradient detecting step of detecting gradients of image signals of color components different from the reference image signal of the pixel, which are used as suppression target image signals, and outputting suppression target gradient signals;

a suppression coefficient computing step of computing color fringing suppression coefficients of the respective suppression target image signals of the pixel based on the reference gradient signal and the suppression target gradient signals; and a combining step of combining each of the suppression target image signals of the pixel with the reference image signal by weighting the reference image signal based on the color fringing suppression coefficients, and outputting the combined signals as image signals of the color components in which the color fringing is suppressed, wherein in the suppression coefficient computing step, the suppression target image signals of the pixel are classified into regions, the regions being defined in accordance with magnitude relationships between values of the reference gradient signal and the suppression target gradient signals, each region having a corresponding function specified in advance, wherein the color fringing suppression coefficients of the respective suppression target image signals of the pixel are computed by using the function corresponding to the region into which the respective target image signal is classified.

* * * * *